US010747068B2

(12) United States Patent
Joo et al.

(10) Patent No.: US 10,747,068 B2
(45) Date of Patent: *Aug. 18, 2020

(54) DISPLAY DEVICE

(71) Applicant: Samsung Display Co., Ltd., Yongin-si, Gyeonggi-Do (KR)

(72) Inventors: Sun Kyu Joo, Suwon-si (KR); Keun Chan Oh, Hwaseong-si (KR); Jun Woo Lee, Seongnam-si (KR); Yun Ho Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,004

(22) Filed: Apr. 22, 2019

(65) Prior Publication Data
US 2019/0250440 A1    Aug. 15, 2019

Related U.S. Application Data

(63) Continuation of application No. 15/869,398, filed on Jan. 12, 2018, now Pat. No. 10,317,742.

(30) Foreign Application Priority Data
Apr. 5, 2017   (KR) .................. 10-2017-0044067

(51) Int. Cl.
G02F 1/1335    (2006.01)
G02F 1/1333    (2006.01)
(Continued)

(52) U.S. Cl.
CPC .......... *G02F 1/1343* (2013.01); *G02F 1/1339* (2013.01); *G02F 1/133345* (2013.01);
(Continued)

(58) Field of Classification Search
CPC ......... G02F 1/133512; G02F 1/136286; G02F 1/1368; G02F 1/133514; G02F 1/1345;
(Continued)

(56) References Cited

U.S. PATENT DOCUMENTS

2009/0121232 A1*   5/2009  Huh .................. G02F 1/136227
                                                                 257/72
2015/0277200 A1   10/2015  Baek et al.
(Continued)

*Primary Examiner* — Thoi V Duong
(74) *Attorney, Agent, or Firm* — Innovation Counsel LLP

(57) ABSTRACT

A display device includes a first base substrate including a display area and a peripheral area around the display area; a voltage line disposed on the peripheral area of the first base substrate; a protrusion disposed on the voltage line and including a first pattern containing a first color material and a second pattern containing a second color material different from the first color material; a connection electrode disposed on the protrusion and connected with the voltage line; and a light-blocking pattern disposed on the connection electrode and provided with an opening for partially exposing the connection electrode, wherein the protrusion includes a multilayer portion where the first pattern and the second pattern overlap each other and a single-layer portion where the first pattern and the second pattern do not overlap each other, and a lateral surface of the light-blocking pattern, defining the opening, overlaps the single-layer portion.

22 Claims, 21 Drawing Sheets

(51) Int. Cl.
*G02F 1/1343* (2006.01)
*G02F 1/1362* (2006.01)
*G02F 1/1339* (2006.01)

(52) U.S. Cl.
CPC .. *G02F 1/136209* (2013.01); *G02F 1/136286* (2013.01); *G02F 2001/13398* (2013.01); *G02F 2001/136222* (2013.01)

(58) Field of Classification Search
CPC ............ G02F 1/133345; G02F 1/1339; G02F 1/13452; G02F 1/134309; G02F 1/136209; G02F 1/13439; G02F 1/136227; G02F 1/1362; G02F 1/1333; G02F 1/1335; G02F 1/13454; G02F 1/13458; G02F 1/1343; G02F 2001/133388; G02F 2001/134372; G02F 2001/136222; G02F 2001/13398; G02F 2201/121; G02F 1/13394; G02F 2201/122; H01L 27/124; H01L 27/3244; H01L 27/3276; G09G 2300/0426
See application file for complete search history.

(56) References Cited

U.S. PATENT DOCUMENTS

| | | |
|---|---|---|
| 2016/0342046 A1 | 11/2016 | Wu |
| 2017/0053949 A1 | 2/2017 | Shin et al. |
| 2017/0102578 A1 | 4/2017 | Shin et al. |

\* cited by examiner

DISPLAY DEVICE

CROSS-REFERENCE TO RELATED APPLICATIONS

This application is a continuation application of U.S. patent application Ser. No. 15/869,398 filed Jan. 12, 2018, which claims priority to and the benefit of Korean Patent Application No. 10-2017-0044067, filed on Apr. 5, 2017, in the Korean Intellectual Property Office, the disclosure of which is incorporated herein in its entirety by reference.

BACKGROUND

1. Field

The technical field relates to a display device.

2. Description of the Related Art

A display device, such as a liquid crystal display device, may include a display panel including a switching element and a pixel electrode. The display device may further include a counter panel including a common electrode.

The display panel may receive electrical signals provided from an external device, for driving the switching element and the pixel electrode. In an embodiment, the common electrode may receive a common voltage for forming an electric field with the pixel electrode.

SUMMARY

Embodiments may be related to a display device with a reliable peripheral area and satisfactory image display quality.

An embodiment may be related to a display device. The display device may include the following elements: a first base substrate including a display area and a peripheral area around the display area; a voltage line disposed on the peripheral area of the first base substrate; a protrusion disposed on the voltage line and including a first pattern containing a first color material and a second pattern containing a second color material different from the first color material; a connection electrode disposed on the protrusion and connected with the voltage line; and a light-blocking pattern disposed on the connection electrode and provided with an opening for partially exposing the connection electrode, wherein the protrusion includes a multilayer portion where the first pattern and the second pattern overlap each other and a single-layer portion where the first pattern and the second pattern do not overlap each other, and a lateral surface of the light-blocking pattern, defining the opening, overlaps the single-layer portion.

An embodiment may be related to a display device. The display device may include the following elements: a first base substrate including a display area and a peripheral area around the display area; a voltage line disposed on the peripheral area of the first base substrate; a protrusion disposed on the voltage line and including a first pattern containing a first color material, a second pattern containing a second color material different from the first color material, and a third pattern containing a third color material different from the first color material and the second color material; a connection electrode disposed on the protrusion and connected with the voltage line; and a light-blocking pattern disposed on the connection electrode, partially overlapping the protrusion, and provided with an opening for partially exposing the connection electrode, wherein the protrusion includes a first multilayer portion where all the first pattern, the second pattern, and the third pattern overlap each other and a single-layer portion where the first pattern, the second pattern, and the third pattern do not overlap each other at all, and a lateral surface of the light-blocking pattern, defining the opening, does not overlap the first multilayer portion.

An embodiment may be related to a display device. The display device may include the following elements: a first base substrate including a display area and a peripheral area around the display area; a voltage line disposed on the peripheral area of the first base substrate; a protrusion disposed on the voltage line and containing a color material; an organic layer disposed on the voltage line and the protrusion and including a first upper surface not overlapping the protrusion, a second upper surface disposed relatively above the first upper surface, and a third upper surface connected with the first upper surface and the second upper surface; a connection electrode disposed on the organic layer and connected with the voltage line; and a light-blocking pattern disposed on the connection electrode, partially overlapping the protrusion, and provided with an opening for partially exposing a portion of the connection electrode, the portion overlapping the second upper surface, wherein the second upper surface includes a portion having a maximum height from one surface of the first base substrate to the upper surface of the organic layer, and a lateral surface of the light-blocking pattern, defining the opening, overlaps the third upper surface.

The first edge portion may partially cover the color member in a direction perpendicular to a face of the first base substrate.

The color member may include a first member and a second member. The first member may contain (and/or may be formed of) the first color material. The second member may contain (and/or may be formed of) a second color material different from the first color material and may be positioned between the connection electrode and the first member. The first member may be positioned between the second member and the voltage line, may include a covered portion covered by the second member, and may include an exposed portion exposed by the second member.

The light-blocking unit may completely cover the exposed portion in the direction perpendicular to a face of the first base substrate.

The first edge portion may partially or completely cover the exposed portion without covering the second member in the direction perpendicular to a face of the first base substrate. The second member may overlap the voltage line.

A difference between a maximum height of the light-blocking unit relative to the first base substrate and a maximum height of the connection electrode relative to the first base substrate may be in a range of 0 μm to 2 μm.

The display device may include an organic layer disposed between the connection electrode and the first member and including a hole partially exposing the voltage line. The connection electrode may directly contact the voltage line through the hole. The light-blocking unit may cover the hole. A portion of the light-blocking unit may be positioned inside the hole.

The display device may include the following elements: a gate line disposed on the display area; a data line electrically isolated from the gate line and intersecting the gate line; a switching element disposed on the display area and electrically connected to each of the gate line and the data line; a passivation layer disposed on the switching element; a first electrode disposed on the passivation layer and electrically connected to the switching element; a color filter disposed between the first base substrate and the first electrode and overlapping the first electrode; and a light-blocking member disposed on the passivation layer, overlapping the switching element, and made of the same material as the light-blocking unit.

The color filter may contain (and/or may be formed of) the first color material or the second color material.

The color filter may contain (and/or may be formed of) a third color material different from the first color material and the second color material.

The display device may include an organic layer disposed between the switching element and the light-blocking member. The first electrode may be connected to the switching element through a contact hole formed through the organic layer and the passivation layer. The light-blocking member may cover the contact hole.

The display device may include a second electrode facing the first base substrate and electrically connected to the conductive member.

The conductive member may be a conductive ball.

The display device may include a sealing member disposed between the peripheral area of the first base substrate and the second electrode. The conductive ball may be positioned inside the sealing member.

The color member may include a first member, a second member, and a third member. The first member may contain (and/or may be formed of) the first color material. The second member may contain (and/or may be formed of) a second color material different from the first color material. The first member may be positioned between the second member and the connection electrode. The third member may contain (and/or may be formed of) a third color material different from the first color material and the second color material, may be positioned between the second member and the voltage line, and may be positioned between a first part of the first member and a second part of the first member.

The first edge portion may partially or completely cover the first part of the first member in the direction perpendicular to a face of the first base substrate.

The light-blocking unit may completely cover the first part of the first member without covering either of the second member and the third member in the direction perpendicular to a face of the first base substrate.

The light-blocking unit may completely or partially cover the first part of the first member and an exposed portion of the third member that is exposed by the second member without covering the second member in the direction perpendicular to a face of the first base substrate.

The first edge portion may partially cover both the first member and the third member without covering the second member in the direction perpendicular to a face of the first base substrate.

The display device may include the following elements: a gate line disposed on the display area; a data line electrically insulated from the gate line and intersecting the gate line; a switching element disposed on the display area and electrically connected to each of the gate line and the data line; a first electrode electrically connected to the switching element; a color filter disposed between the first base substrate and the first electrode and overlapping the first electrode; and a light-blocking member disposed on the switching element and made of the same material as the light-blocking unit. The color filter may contain (and/or may be formed of) at least one of the first color material, the second color material, and the third color material.

The display device may include a second electrode facing the first base substrate and electrically connected to the conductive member.

The conductive member may be a conductive ball.

The display device may include an organic layer covering the first member. The organic layer may include a first section, a second section disposed farther from the first base substrate than the first upper surface and overlapping the portion of the connection electrode exposed by the opening, and a third section connected between the first section and the second section and oriented not parallel to the face of the first base substrate. The first edge portion may partially cover the third section in the direction perpendicular to a face of the first base substrate.

The color member may include a first member and a second member. The first member may contain (and/or may be formed of) the first color material. The second member may contain (and/or formed of) a second color material different from the first color material, positioned between the first member and the connection electrode, and covering a covered portion of the first member. The second section may cover the covered portion of the first member in the direction perpendicular to a face of the first base substrate.

The display device may include the following elements: a second member containing (and/or formed of) a second color material different from the first color material; and a third member containing (and/or formed of) a third color material different from the first color material and the second color material. The second upper surface may cover each of the first member the second member, and the third member in the direction perpendicular to a face of the first base substrate.

The display device may include the following elements: a gate line disposed on the display area; a data line electrically insulated from the gate line and intersecting the gate line; a switching element disposed on the display area of the first base substrate and electrically connected to each of the gate line and the data line; a first electrode electrically connected to the switching element; a color filter disposed between the first base substrate and the first electrode, overlapping the first electrode, and containing (and/or formed of) the first color material; a light-blocking member disposed on the switching element and made of the same material as the light-blocking unit; and a second electrode facing the first base substrate and electrically connected to the conductive member.

The conductive member may be a conductive ball.

The first member may be positioned between two sections of the connection electrode that both extend perpendicular to the face of the first base substrate.

DETAILED DESCRIPTION OF EMBODIMENTS

Figure 1:
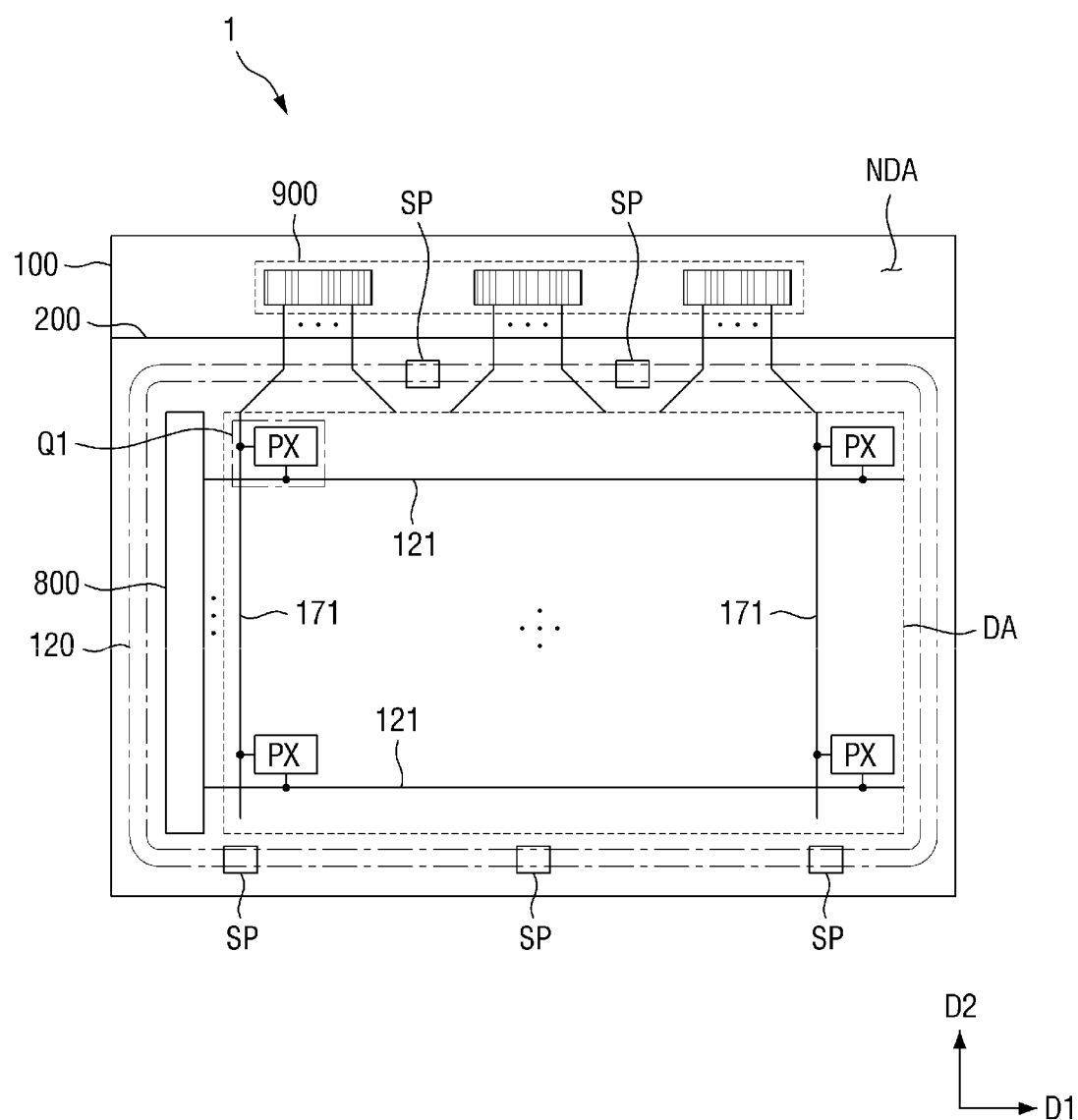
FIG. 1 is a plan view of a display device according to an embodiment.

Example embodiments are described with reference to the accompanying drawings. The example embodiments may be embodied in many different forms and should not be construed as being limited. Like reference numerals may refer to like elements in the description.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for describing particular embodiments and is not intended to be limiting. The singular forms "a", "an" and "the" may include the plural forms as well, unless the context clearly indicates otherwise. The term(s) "comprises" and/or "comprising" may specify the presence of stated steps and/or elements, but may not preclude the presence or addition of one or more other steps and/or elements.

When a first element is referred to as being "on", "connected to" or "coupled to" a second element or layer, the first element can be directly on, connected or coupled to the second element, or one or more intervening elements may be present between the first element and the second element. In contrast, when a first element is referred to as being "directly on", "directly connected to" or "directly coupled to" a second element or layer, there are no intended intervening elements (except environmental elements such as air) present between the first element and the second element. The term "and/or" may include any and all combinations of one or more of the associated items.

Spatially relative terms, such as "beneath", "below", "lower", and "above", "upper", may be used to describe one element or feature's relationship to another element(s) or feature(s). The spatially relative terms may encompass different orientations of the device in use or operation in addition to the described orientation(s). For example, if the device is turned over, elements described as "below" or "beneath" other elements or features would then be positioned "above" the other elements or features. Thus, the term "below" can encompass both a position of above and below. The device may be otherwise oriented (e.g., rotated 90 degrees or at other orientations), and the spatially relative descriptors may be interpreted accordingly.

Unless otherwise defined, all terms (including technical and scientific terms) used herein have the same meaning as commonly understood by one of ordinary skill in the art to which the present application belongs. Terms, such as those defined in commonly used dictionaries, should be interpreted as having a meaning that is consistent with their meaning in the context of the relevant art and this specification and should not be interpreted in an idealized or overly formal sense unless expressly so defined herein.

In the drawings, components may be exaggerated or reduced in size for convenience of explanation.

The term "pattern" may mean "member", "unit", or "element". The term "sectional" may mean "cross-sectional". The term "connect" may mean "electrically connect". The term "insulate" may mean "electrically insulate" or "electrically isolate". The term "contain" may mean "be formed of" and/or "include". The term "overlap" or "cover" may be in or according to a direction perpendicular to a bottom face of a base substrate; i.e., when a first element of a device overlaps or covers a second element of the device, the second element is partially or completely blocked by the first element when the device (or a combination of the first element and the second element) is viewed in a direction perpendicular to a base substrate of the device. The term "the line B-B' of FIG. 3" may mean "a line analogous to the line A-A' of FIG. 2". The term "the line A-A' of FIG. 2" may mean "a line analogous to the line B-B' of FIG. 3".

FIG. 1 is a plan view of a display device 1 according to an embodiment.

Referring to FIG. 1, the display device 1 may include a first display panel 100, a second display panel 200 facing the first display panel 100, a liquid crystal layer (not shown) disposed between the first display panel 100 and the second display panel 200.

The first display panel 100 may be a thin film transistor panel that is provided with switching elements for driving liquid crystal molecules in the liquid crystal layer. The switching elements may be, for example, thin film transistors.

The second display panel 200 may face the first display panel 100.

The first display panel 100 includes a display area DA and a peripheral area NDA around (or surrounding) the display area DA. The display area DA is an area in which pixel elements PX are arranged to implement an image, and a peripheral area NDA is an area that does not implement an image.

A gate line 121, a data line 171, and a pixel element PX connected with the gate line 121 and the data line 171 are disposed in the display area DA of the first display panel 100.

A gate driving unit 800, a data driving unit 900, and a voltage line 120 may be disposed in the peripheral area NDA of the first display panel 100. In addition, a connection region SP may be disposed in the peripheral area NDA.

The gate driving unit 800 is a component for providing a gate signal to the gate line 121. In some embodiments, the gate driving unit 800 may be implemented by an amorphous silicon gate (ASG) method in which the gate driving unit 800 is integrally formed in the peripheral area NDA.

The data driving unit 900 is a component for providing a data voltage to the data line 171. In some embodiments, the data driving unit 900 may have a chip on glass (COG) structure. In some embodiments, the data driving unit 900 may have a tape carrier package (TCP) structure or a chip on film (COF) structure.

The gate line 121 extends along a first direction D1, and the plurality of gate lines 121 is provided. The gate line 121 is connected to the gate driving unit 800 disposed in the peripheral area NDA, and receives a gate signal from the gate driving unit 800.

The data line 171 extends along a second direction D2 intersecting the first direction D1, and the plurality of data lines 171 is provided. The data line 171 is connected to the data driving unit 900 disposed in the peripheral area NDA, and receives a data voltage from the data driving unit 900.

The plurality of pixel elements PX are disposed in the display area DA, and are connected with the gate line 121 and the data line 171.

The voltage line 120 is disposed in the peripheral area NDA of the first display panel 100. The voltage line 120 receives a common voltage from an external device (for example, a driving circuit board) or the data driving unit 900. The common voltage is transmitted to a common electrode to be described later.

In some embodiments, the voltage line 120 may surround the periphery of the display area DA. In another embodiment, the voltage line 120 may be disposed in one or more other positions.

The connection region SP is a region where the voltage line 120 and the common electrode (not shown) of the second display panel 200 are electrically connected. The connection region SP may be disposed at a portion of the peripheral area NDA of the first display panel 100, the portion overlapping the second display panel 200, and the plurality of connection regions may be disposed in the peripheral area NDA.

Figure 2:
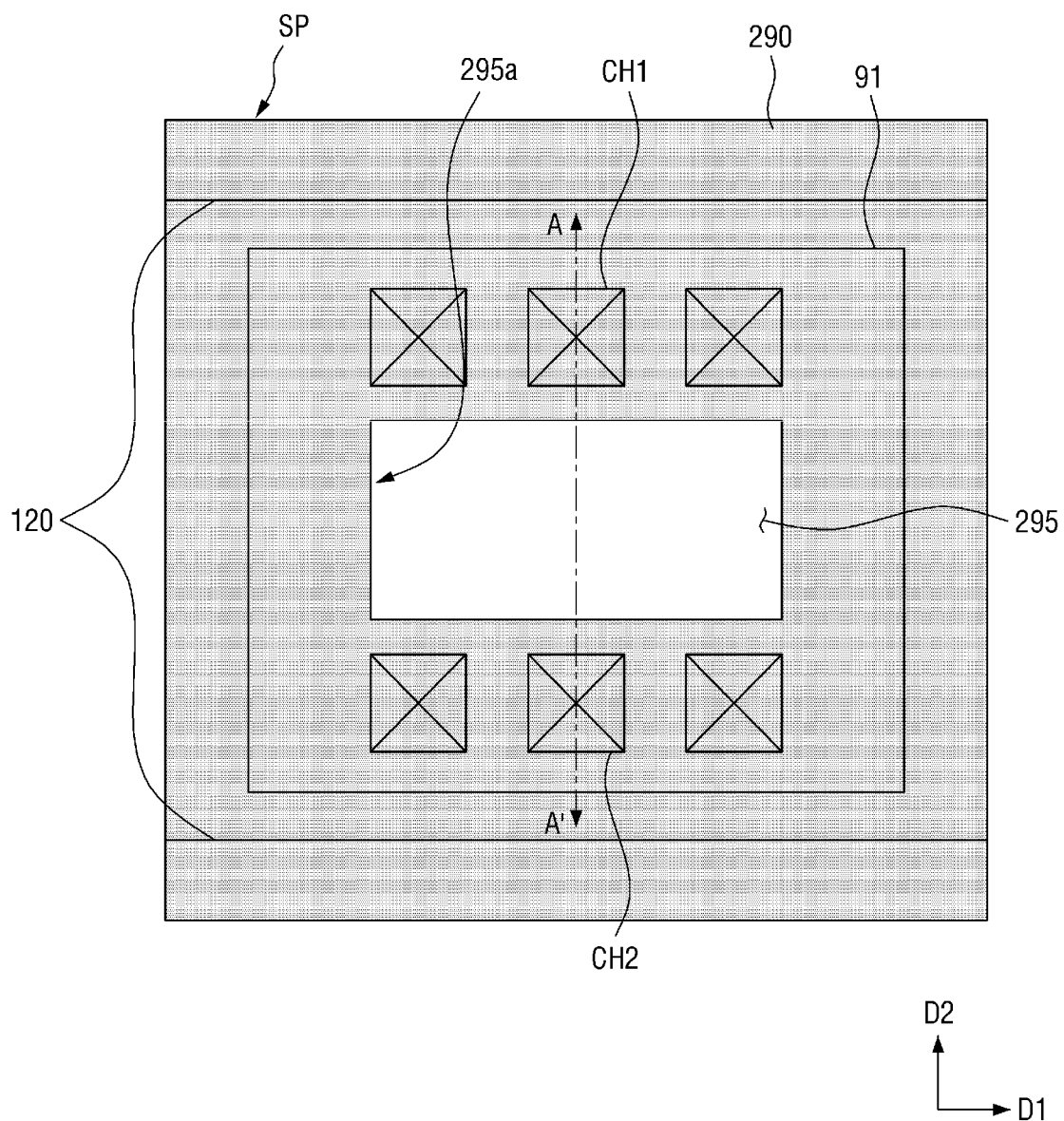
FIG. 2 is an enlarged plan view of a connection region shown in FIG. 1 according to an embodiment.

FIG. 2 is an enlarged plan view of the connection region shown in FIG. 1. Referring to FIG. 2, a voltage line 120, a connection electrode 91 connected with the voltage line 120 through a first hole CH1 and a second hole CH2, and a light-blocking pattern 290 are disposed in the connection region SP.

The light-blocking pattern 290 is provided with an opening 295 for partially exposing the connection electrode 91, and the opening 295 is defined by the lateral surface 295a of the light-blocking pattern 290.

Figure 3:
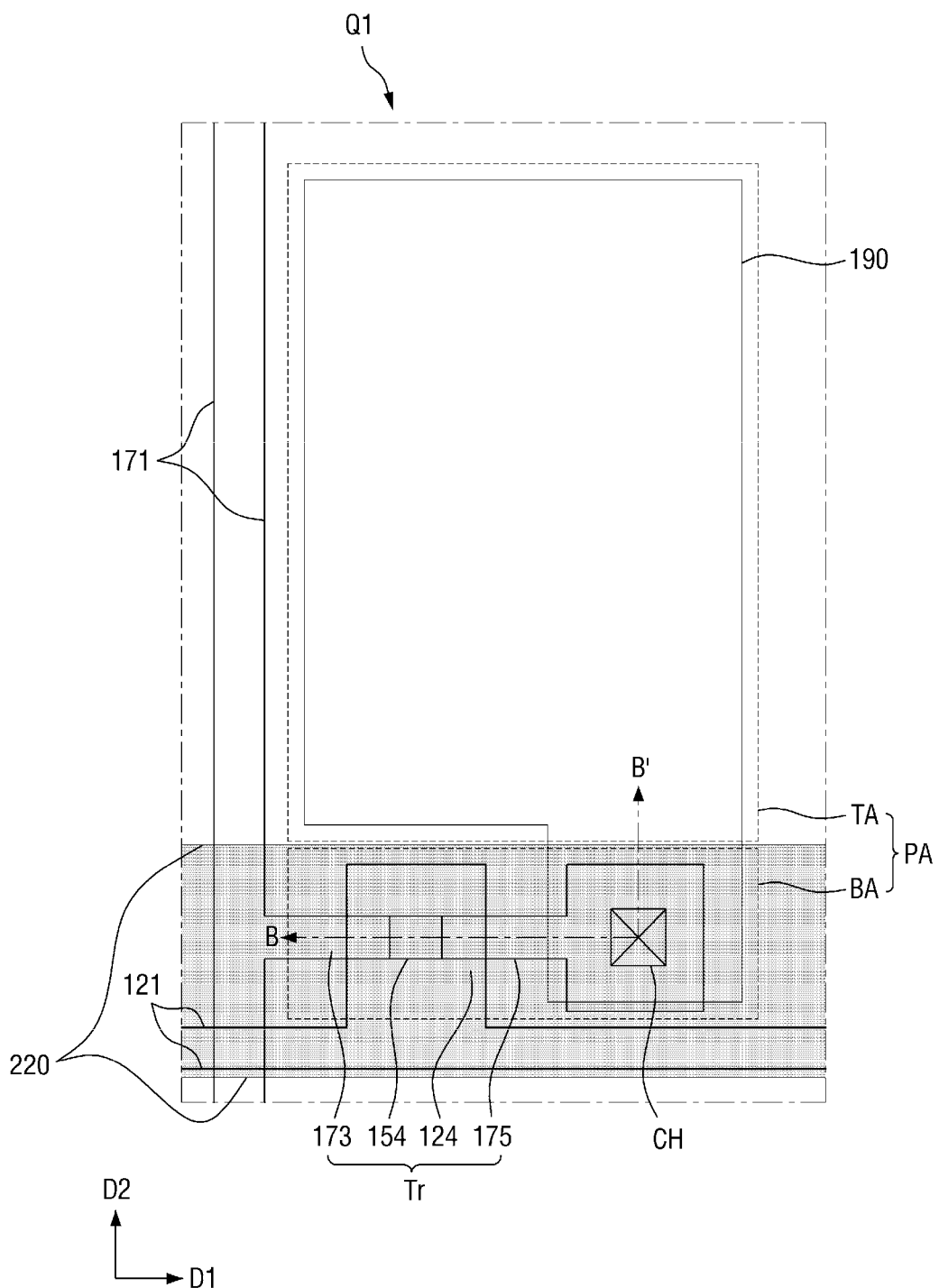
FIG. 3 is an enlarged plan view of the portion Q1 of FIG. 1 according to an embodiment.
Figure 4:
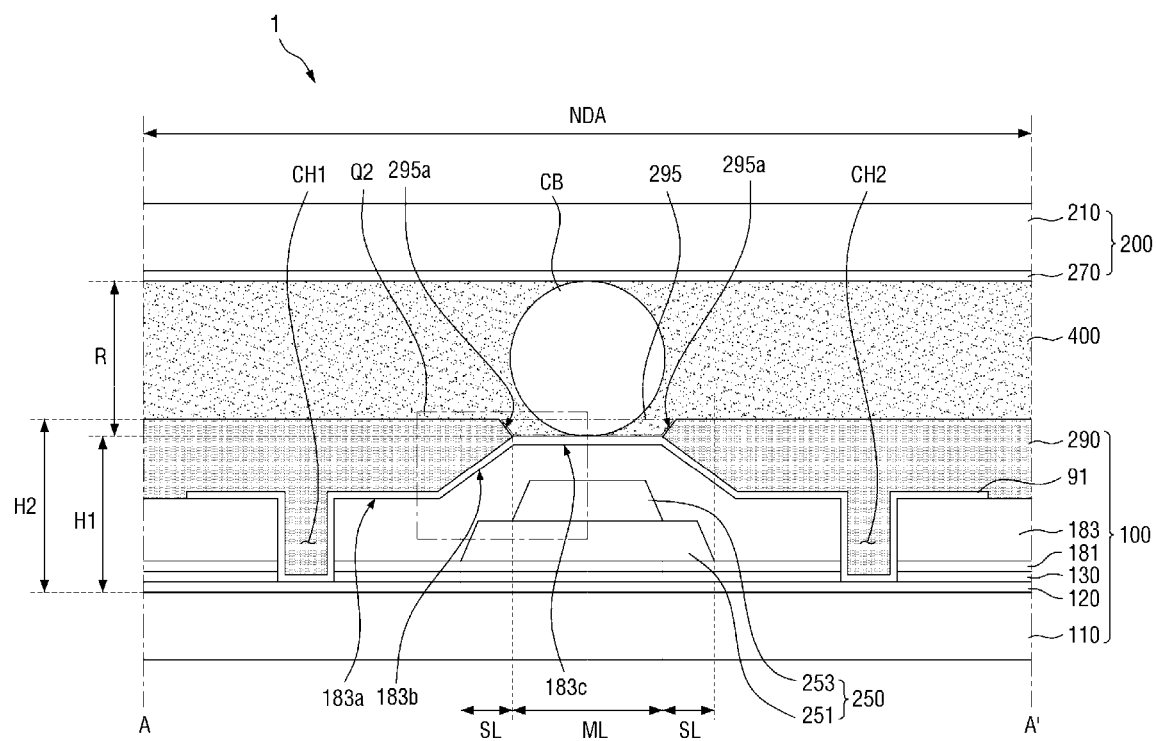
FIG. 4 is a sectional view taken along the line A-A' of FIG. 2 according to an embodiment.
Figure 5:
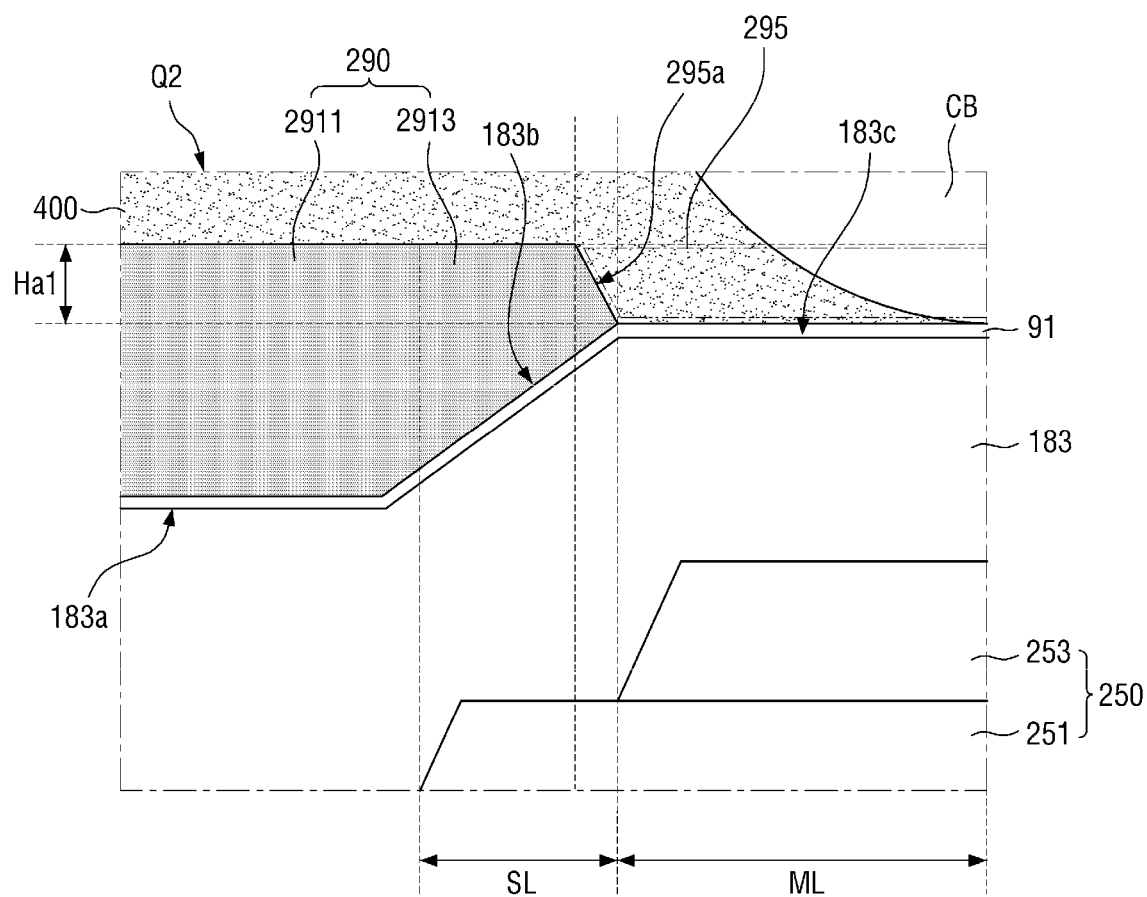
FIG. 5 is an enlarged plan view of the portion Q2 of FIG. 4 according to an embodiment.
Figure 6:
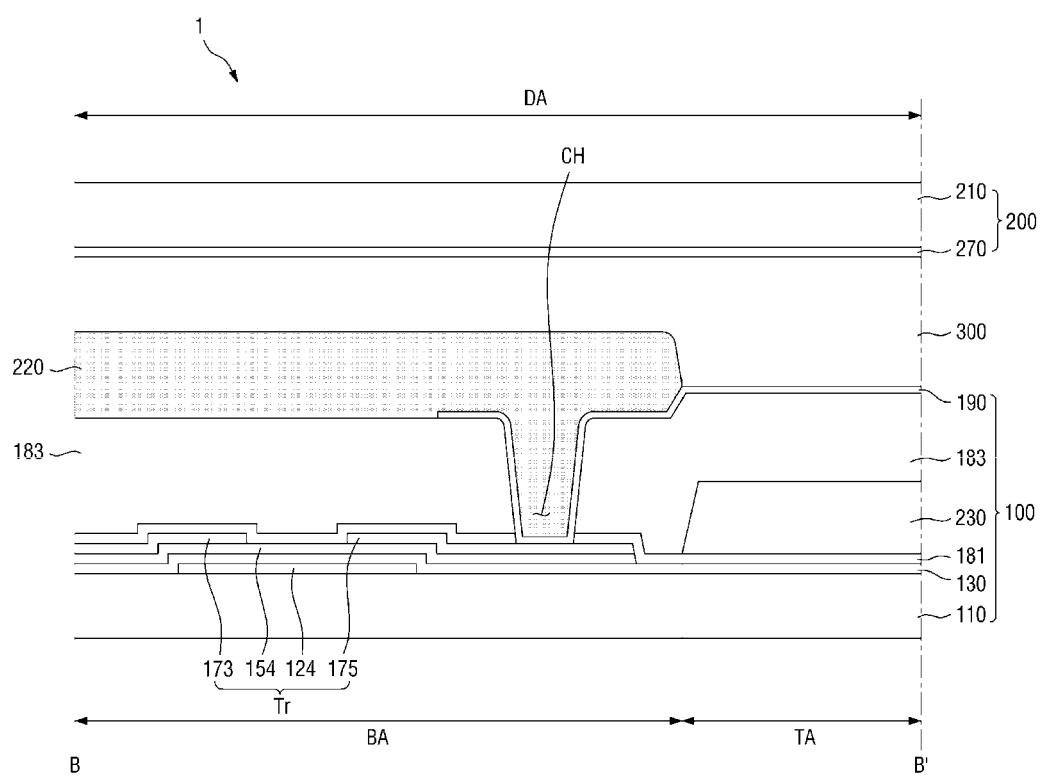
FIG. 6 is a sectional view taken along the line B-B' of FIG. 3 according to an embodiment.

FIG. 3 is an enlarged plan view of the portion Q1 of FIG. 1, e.g., an enlarged plan view showing one pixel element; FIG. 4 is a sectional view taken along the line A-A' of FIG. 2; FIG. 5 is an enlarged plan view of the portion Q2 of FIG. 4; and FIG. 6 is a sectional view taken along the line B-B' of FIG. 3.

Referring to FIGS. 2 to 6, the display device 1 may include a first display panel 100, a second display panel 200 facing the first display panel 100, a sealing member 400 for attaching the first display panel 100 and the second display panel 200, and a liquid crystal layer 300 disposed between the first display panel 100 and the second display panel 200.

The second display panel 200 may include a second base substrate 210 and a common electrode 270.

The second base substrate 210 may be an insulating substrate, and the insulating substrate may be transparent. For example, the second base substrate 210 may contain glass, quartz, plastic, a polyethylene terephthalate resin, a polyethylene resin, or a polycarbonate resin.

The common electrode 270 may be disposed on one side of the second base substrate 210, the one side facing the first display panel 100. The common electrode 270 may contain a transparent conductive material. For example, the common electrode 270 may contain a metal oxide such as indium zinc oxide, indium tin oxide, tin oxide, or zinc oxide. In some embodiments, the common electrode 270 may be formed over the entire surface of the second base substrate 210. A common voltage is applied to the common electrode 270 to form an electric field together with a pixel electrode 190 to be described later.

The liquid crystal layer 300 may include a plurality of liquid crystal molecules having dielectric anisotropy. When an electric field is applied between the first display panel 100 and the second display panel 200, the liquid crystal molecules rotate in a specific direction between the first display panel 100 and the second display panel 200, thereby transmitting or blocking light. Here, the term "rotation" may mean not only that the liquid crystal molecules actually rotate, but also that the alignment of the liquid crystal molecules is changed by the electric field. In some embodiments, the liquid crystal layer 300 may contain a reactive mesogen that undergoes a polymerization reaction with light such as ultraviolet light, or may contain a linear gradient providing polymer that is formed by a polymerization reaction of a reactive mesogen. The linear gradient providing polymer may provide a linear gradient to the liquid crystal molecules even when no electric field is formed between the first display panel 100 and the second display panel 200.

The sealing member 400 attaches the first display panel 100 and the second display panel 200 together. The sealing member 400 may be located at the peripheral area NDA of the first display panel 100.

The first display panel 100 may include a first base substrate 110.

The first base substrate 110 may be an insulating substrate and may be transparent. For example, the first base substrate 110 may contain glass, quartz, plastic, a polyethylene terephthalate resin, a polyethylene resin, or a polycarbonate resin.

The first base substrate 110 may include the display area DA and the peripheral area NDA, which have been described with reference to FIG. 1. The display area DA may include a pixel area PA. The pixel area PA may be an area in which the pixel element PX for driving one pixel is disposed. The pixel area PA may include a light-transmitting area TA and a light-blocking area BA. A pixel electrode 190, which will be described later, may be disposed on the light-transmitting area TA of the pixel area PA, and a switching element, which will be described later, may be disposed on the light-blocking area BA. The switching element may be, for example, a thin film transistor Tr.

First, a configuration related to the display area DA will be described.

The gate line 121 extending in the first direction D1 and the gate electrode 124 connected to the gate line 121 may be disposed on the display area DA of the first base substrate 110. The gate electrode 124 may be disposed on the light-blocking area BA in the display area DA of the first base substrate 110. In some embodiments, the gate line 121 and the gate electrode 124 may contain an opaque metal material. Here, the opaque metal material is a concept including a metal material that blocks light. For example, the opaque metal material may be an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), or the like.

A gate insulating film 130 may be disposed on the gate line 121 and the gate electrode 124. The gate insulating layer 130 may be disposed on the peripheral region NDA as well as display region DA of the first base substrate 110. The gate insulating layer 130 may be made of an insulating material, and, illustratively, may be made of silicon nitride, silicon oxide, silicon oxynitride, or the like. The gate insulating film 130 may have a single-layer structure or a multi-layer structure including at least two insulating layers having different physical properties.

A semiconductor layer 154 may be disposed on the gate insulating film 130. The semiconductor layer 154 is disposed so as to overlap the light-blocking area BA in the display area DA of the first base substrate 110. At least a part of the semiconductor layer 154 overlaps the gate electrode 124. The semiconductor layer 154 may contain amorphous silicon or polycrystalline silicon. In some embodiments, the semiconductor layer 154 may contain indium (In), zinc (Zn), gallium (Ga), tin (Sn), or hafnium (Hf). In some embodiments, the semiconductor layer 154 may contain indium gallium zinc oxide (IGZO), indium tin zinc oxide (ITZO), or hafnium indium zinc oxide (HIZO).

The data line 171 may be insulated from the gate line 121, and may extend in a direction intersecting the gate line 121, for example, in a second direction (D2 direction). The data line 171 may intersect the gate line 121 to define the pixel area PA.

A source electrode 173 is connected with the data line 171. The source electrode 173 is disposed so as to overlap the light-blocking area BA of the first base substrate 110, and overlaps the gate electrode 124. In some embodiments, the source electrode 173, as shown in FIG. 3, may protrude from the data line 171 to overlap the gate electrode 124. In some embodiments, the source electrode 173 may be located on the same line as the data line 171.

A drain electrode 175 may overlap the light-blocking area BA of the first base substrate 110, and may face the source electrode 173 on the gate electrode 124. In some embodiments, the drain electrode 175 may include a bar-shaped portion extending approximately parallel to the source electrode 173 and an extension portion opposite to the bar-shaped portion.

In some embodiments, the above-described data line 171, source electrode 173, and drain electrode 175 may be made of aluminum, copper, silver, molybdenum, chromium, titanium, tantalum, or an alloy.

The gate electrode 124, the source electrode 173, and the drain electrode 175 may form a switching element, for example, a thin film transistor Tr together with the semiconductor layer 154. The thin film transistor Tr may be disposed on the light-blocking area BA in the pixel region PA of the first base substrate 110.

A passivation layer 181 may be disposed on the gate insulating film 130, the semiconductor layer 154, the source electrode 173, and the drain electrode 175. The passivation layer 181 may be disposed on the peripheral area NDA as well as display area DA of the first base substrate 110. The passivation layer 181 may contain an inorganic insulating material such as silicon oxide, silicon nitride, or silicon oxynitride. The passivation layer 181 can protect the thin film transistor Tr, and can prevent a material contained in a color filter 230, which will be described later, from flowing into the semiconductor layer 154.

A color filter 230 may be disposed on the passivation layer 181. The color filter 230 may be disposed so as to overlap the light-transmitting area TA. In some embodiments, the color filter 230 may not overlap the light-blocking area BA, or only a part of the edge thereof may overlap the light-blocking area BA. Further, in some embodiments, the color filter 230 may not overlap a contact hole CH.

The color filter 230 may be made of a photosensitive organic material including a color material. Here, the color material may mean a colorant such as a dye or a pigment necessary for making a single color. In an embodiment, the color material may be at least one of a red colorant, a green colorant, and a blue colorant that may exhibit three primary colors. In an embodiment, the color material may include a colorant that exhibits at least one of other three primary colors such as magenta, cyan, and yellow.

In some embodiments, the color material may be a phosphor or a quantum dot.

An organic layer 183 may be disposed on the passivation layer 181 and the color filter 230. The organic layer 183 serves to alleviate the unevenness caused by the thin film transistor Tr and the color filter 230 and to improve the flatness of the display device 1. The organic layer 183 may cover the thin film transistor Tr and the color filter 230. In some embodiments, the organic layer 183 may be made of a photosensitive organic material.

A contact hole CH for exposing at least a part of the drain electrode 175 is formed in the organic layer 183 and the passivation layer 181.

A pixel electrode 190 may be disposed on the organic layer 183. The pixel electrode 190 may overlap the light-transmitting area TA of the pixel area PA. A part of the pixel electrode 190 extends to overlap the light-blocking area BA, and is physically and electrically connected to the drain electrode 175 through the contact hole CH.

The pixel electrode 190 may contain a transparent conductive material. For example, the pixel electrode 190 may contain a metal oxide such as indium zinc oxide, indium tin oxide, tin oxide, or zinc oxide.

A light-blocking member 220 may be disposed on the organic layer 183. The light-blocking member 220, which is a component for preventing light leakage, is referred to as a black matrix. In some embodiments, the light-blocking member 220 may contain a photosensitive organic material including a light-blocking material. The light-blocking member 220 may overlap the light-blocking area BA, and may not overlap the light-transmitting area TA. The light-blocking member 220 may cover a portion of the thin film transistor Tr, the contact hole CH and the pixel electrode 190 overlapping the light-blocking area BA. In some embodiments, the light-blocking member 220 may have a shape extending along the first direction D1.

Next, a configuration related to the connection region SP in the peripheral area NDA will be described.

A voltage line 120, a gate insulating film 130, a passivation layer 181, a protrusion 250, a connection electrode 91, and a light-blocking pattern 290 may be disposed on the peripheral area NDA of the first base substrate 110.

The voltage line 120, which is a component receiving a common voltage, may be formed from the same layer as the gate line 121 or the data line 171. Therefore, the voltage line 120 can be disposed on the same layer as the gate line 121 or the data line 171. The voltage line 120 may be made of the same material as the gate line 121 or the data line 171, for example, an opaque metal material, and may block the light incident from the lower portion of the first base substrate 110. Hereinafter, for convenience of explanation, a case where the voltage line 120 is disposed on the same layer as the gate line 121 and is made of the same material as the gate line 121 will be described as an example.

The gate insulating film 130 is disposed on the voltage line 120, and the passivation layer 181 is disposed on the gate insulating film 130.

The protrusion 250 is disposed on the passivation layer 181. The protrusion 250 provides a step to the components located on the upper side of the protrusion 250, for example, an organic layer 183 and a connection electrode 91, which will be described later. The protrusion 250 may not overlap a first hole CH1 and a second hole CH2, which will describe later, and may be spaced apart from the first hole CH1 and the second hole CH2.

The protrusion 250 may include a first pattern 251 and a second pattern 253 overlapping the first pattern 251. The first pattern 251 and the second pattern 253 may overlap each other. The laminating order of the first pattern 251 and the second pattern 253 may be configured differently according to different embodiments. Illustratively, as shown in FIG. 4, the first pattern 251 may disposed on the passivation layer 181, and the second pattern 253 may be disposed on the first pattern 251.

In some embodiments, the width of the first pattern 251 may be greater than the width of the second pattern 253. Illustratively, as shown in FIGS. 2 and 4, the width of the first pattern 251 in the second direction D2 may be greater than the width of the second pattern 253 in the second direction D2. However, this is only an example, and the present invention is not limited thereto.

The first pattern 251 may be made of a photosensitive organic insulating material including a first color material. In an embodiment, the first color material may be at least one of a red colorant, a green colorant, and a blue colorant. In an embodiment, the first color material may be a colorant that exhibits three primary colors such as magenta, cyan, and yellow.

The second pattern 253 may be made of a photosensitive organic insulating material including a second color material. The second color material may be a color material different from the first color material contained in the first pattern 251. For example, when the first pattern 251 contains a red colorant as the first color material, the second pattern 253 may contain a green colorant or a blue colorant as the second color material.

In some embodiments, the first color material contained in the first pattern 251 or the second color material contained in the second pattern 253 may be the same as the color material contained in the color filter 230. Illustratively, when the color filter 230 contains a red colorant as the color material, the first pattern 251 may also contains a red colorant as the first color material. In this case, the color filter 230 and the first pattern 251 may be formed from the same layer, and may be formed simultaneously using the same mask.

In some embodiments, the first color material and the second color material may be different from the color material contained in the color filter 230. In other words, the color filter 230 may contain a third color material different from the first color material and the second color material.

Illustratively, when the first pattern 251 contains a red colorant as the first color material and the second pattern 253 contains a green colorant as the second color material, the color filter 230 may also contain a blue vehicle as the third color material.

When the display device 1 includes a red filter, a green filter, and a blue filter, examples of color material combinations of the first pattern 251, the second pattern 253, and the color filter 230 are as follows. Each of the following parentheses represents one color material combination. In each of the parentheses, the first color material of the first pattern 251, the second color material of the second pattern 253, and the color material of the color filter 230 are sequentially described. Here, R means a red colorant, G means a green colorant, and B means a blue colorant.

(R, G, R), (R, G, G), (R, G, B), (R, B, R), (R, B, G), (R, B, B), (G, R, R), (G, R, G), (G, R, B), (G, B, R), (G, B, G), (G, B, B), (B, R, R), (B, R, G), (B, R, B), (B, G, R), (B, G, G), (B, G, B)

The protrusion 250 may overlap the voltage line 120, and may block or absorb external light reflected by the voltage line 120.

If portions of the protrusions 250 are identified based on the overlapping relationship between the first pattern 251 and the second pattern 253, the protrusion 250 may include a multilayer portion ML where the first pattern 251 and the second pattern 253 overlap each other and may include a single-layer portion SL where the first pattern 251 and the second pattern 253 do not overlap each other. In some embodiments, the single-layer portion SL may be composed of only a portion of the first pattern 251.

The multilayer portion ML may overlap the voltage line 120. Since the multilayer portion ML includes the first pattern 251 containing the first color material and the second pattern 253 containing the second color material, the light reflected by the voltage line 120 can be effectively blocked or absorbed. Illustratively, assuming that the first pattern 251 contains a red colorant and the second pattern 253 contains a green colorant, in external light, the light of a green wavelength band transmits the second pattern 253, and the light of a red wavelength band and the light of a blue wavelength band are blocked by the second pattern 253. Then, when the light of a green wavelength band having transmitted the second pattern 253 is incident on the first pattern 251, this light of a green wavelength band is blocked by the first pattern 251. Similarly, when external light is reflected by the voltage line 120, in the reflected light, the reflected light of a red wavelength band transmits the first pattern 251, and the reflected light of a green wavelength band and the reflected light of a blue wavelength band are blocked by the first pattern 251. Then, when the reflected light of a red wavelength band having transmitted the first pattern 251 is incident on the second pattern 253, this incident reflected light of a red wavelength band is blocked by the second pattern 253. Accordingly, the external light incident on the voltage line 120 and the light reflected by the voltage line 120 can be effectively blocked or absorbed.

In some embodiments, the single-layer portion SL may also overlap the voltage line 120, thereby partially blocking or absorbing the external light incident on the voltage line 120 and the light reflected by the voltage line 120.

As will be described later, the single-layer portion SL may overlap the light-blocking pattern 290. Therefore, in some embodiments, the width of the single-layer portion SL may be in a range of 4 μm to 7.5 μm in order to ensure process margin (or overlap margin).

An organic layer 183 for covering the protrusion 250 may be disposed on the passivation layer 181. A first hole CH1 and second hole CH2 for partially exposing the voltage line 120 may be formed in the organic layer 183, the passivation layer 181 and the gate insulating layer 130.

In the peripheral area NDA, the organic layer 183 may include a first upper surface 183*a*, a second upper surface 183*c*, and a third upper surface 183*b* connecting the first upper surface 183*a* to the second upper surface 183*c*.

The first upper surface 183*a* is a portion of the upper surface of the organic layer 183, the portion not overlapping the protrusion 250 in the peripheral area NDA, particularly, the connection region SP. The first upper surface 183*a* may be disposed between the first hole CH1 and the protrusion 250 or between the second hole CH2 and the protrusion 250. In some embodiments, the first upper surface 183*a* may be a flat surface. In an embodiment, the first upper surface 183*a* may include a curved surface.

The second upper surface 183*c* is a portion of the upper surface of the organic layer 183, the portion overlapping the multilayer portion ML of the protrusion 250, and includes a point at which the spacing distance from one surface (illustratively, upper surface) of the first base substrate 110 to the upper surface of the organic layer 183 is the greatest, that is, an apex. The second upper surface 183*c* is located relatively higher than the first upper surface 183*a* because the multilayer portion ML of the protrusion 250 provides a step. Therefore, the average spacing distance between one surface (illustratively, upper surface) of the first base substrate 110 and the second upper surface 183*c* is greater than the average spacing distance between one surface (illustratively, upper surface) of the first base substrate 110 and the first upper surface 183*a*. In some embodiments, the second upper surface 183*c* may be a flat surface. In an embodiment, the second upper surface 183*c* may include a curved surface.

The third upper surface 183*b* is a portion of the upper surface of the organic layer 183, the portion being connected between the first upper surface 183*a* and the second upper surface 183*c*. In some embodiments, the third upper surface 183*b* may be an inclined surface. The third upper surface 183*b* may not overlap the multilayer portion ML of the protrusion 250 and may overlap the single-layer portion SL of the protrusion 250. The average spacing distance between one surface (illustratively, upper surface) of the first base substrate 110 and the third upper surface 183*b* may be smaller than the spacing distance between one surface (illustratively, upper surface) of the first base substrate 110 and the second upper surface 183*c*, and may be greater than the spacing distance between one surface (illustratively, upper surface) of the first base substrate 110 and the first upper surface 183*a*. In some embodiments, the third upper surface 183*b* may be a flat surface. In an embodiment, the third upper surface 183*b* may include a curved surface.

A connection electrode 91 may be disposed on the organic layer 183. The connection electrode 91 may be electrically connected to the voltage line 120 through at least one of the first hole CH1 and the second hole CH2. The connection electrode 91 may be disposed on the first upper surface 183*a*, second upper surface 183*c* and third upper surface 183*b* of the organic layer 183.

In some embodiments, the connection electrode 91 may be formed from the same layer as the pixel electrode 190. Accordingly, the connection electrode 91 may contain the same material as the pixel electrode 190, for example, a transparent conductive material.

A light-blocking pattern 290 is disposed on the organic layer 183 and the connecting electrode 91. The light-blocking pattern 290 blocks or absorbs the light incident from the lower portion of the first base substrate 110 and the external light reflected by the voltage line 120. The light-blocking pattern 290 may cover the first hole CH1 and the second hole CH2.

The light-blocking pattern 290 may be formed from the same layer as the light-blocking member 220. Accordingly, the light-blocking pattern 290 may be made of the same material as the light-blocking member 220, for example, a photosensitive organic material including a light-blocking material.

An opening 295 for partially exposing the connection electrode 91 may be formed in the light-blocking pattern 290. That is, the light-blocking pattern 290 may not be disposed in the opening 295, and the lateral surface 295*a* of the light-blocking pattern 290 surrounding the opening 295 may define the opening 295 and may include opposite edge portions positioned at opposite sides of the opening 295. The opening 295 may expose a portion of the multilayer portion ML of the connection electrode 91 and/or a portion of the connection electrode 91 disposed on the second upper surface 183*c* of the organic layer 183.

Considering the relationship between the light-blocking pattern 290 and the protrusion 250, the lateral surface 295*a* of the light-blocking pattern 290, defining the opening 295, may overlap the single-layer portion SL. In some embodiments, the light-blocking pattern 290 may completely cover the single-layer portion SL. In other words, the entire single-layer portion SL may overlap (and/or be covered by) the light-blocking pattern 290. Since the single-layer portion SL, unlike the multilayer portion ML, is a portion where the first pattern 251 and the second pattern 253 do not overlap each other, the single-layer portion SL has a single pattern. Therefore, even if the single-layer portion SL overlaps the voltage line 120, there is a possibility that the external light incident on the voltage line 120 and the light reflected by the voltage line 120 are not blocked. Thus, there is a possibility that display quality deterioration due to the reflection of external light may occur. Illustratively, assuming that the pattern of the single-layer portion SL contains a red colorant, in the external light and reflected light, the light of a red wavelength band is not blocked by the single-layer portion SL. Therefore, the light of a red wavelength band in the external light is reflected by the voltage line 120, and the light of a red wavelength band in the reflected light may be emitted to the outside of the display device 1 again. Thus, there is a possibility that the display quality deterioration of the display device 1 due to the reflection of external light may occur.

In the display device 1, the light-blocking pattern 290 completely covers the single-layer portion SL, so that the external light incident on the voltage line 120 and the light reflected by the voltage line 120 can be effectively blocked or absorbed.

The lateral surface 295*a* of the light-blocking pattern 290, defining the opening 295, may not substantially overlap the multilayer portion ML. In other words, the light-blocking pattern 290 may not substantially overlap the multilayer portion ML. Here, the meaning of not substantially overlapping is concept including not only a case where the lateral surface 295*a* of the light-blocking pattern 290 or the light-blocking pattern 290 does not completely overlap the multilayer portion ML but also a case where the lateral surface 295*a* of the light-blocking pattern 290 or the light-blocking pattern 290 slightly overlaps the multilayer portion ML according to the process margin.

When the light-blocking pattern 290 overlaps the multilayer portion ML, a step may be formed in the light-blocking pattern 290 by the multilayer portion ML around the opening 295. In this case, the contact failure with a conductive member CB may occur due to the step of the light-blocking pattern 290. Further, when the conductive member CB is not disposed in the opening 295 but disposed on the step of the light-blocking pattern 290, the a cell gap between the first display panel 100 and the second display panel 200 increases. Thus, a defect such as an area not filled with liquid crystals or not uniformly spread with liquid crystals may occur. As a result, the display quality of the display device 1 may deteriorate.

In the case of the display device 1, the reflected light due to the voltage line 120 can be blocked by forming the light-blocking pattern 290 so as not to substantially overlap the multilayer portion ML of the protrusion 250 while overlapping the single layer portion SL of the protrusion 250. Further, the display quality deterioration of the display device 1 due to non-uniform spreading of liquid crystals can be prevented by minimizing the step of the light-blocking pattern 290 formed by the protrusion 250. Furthermore, the connection reliability between the common electrode 270 and the connection electrode 91 can be increased and the display quality in the peripheral area can be improved by improving the contact failure of the conductive member CB.

In the light-blocking pattern 290, if the portion overlapping the connection electrode 91 and not overlapping the protrusion 250 is referred to as a first portion 2911, and the portion connected with the first portion 2911 and overlapping the connection electrode 91 and the single-layer portion SL is referred to a second portion 2913, The amount of light provided in the process of forming the first portion 2911 and the amount of light provided in the process of forming the second portion 2913 may be the same as each other. Here, the amount of light means the amount of light transmitting a photomask in the process of forming the light-blocking pattern 290. The meaning of the same amount of light is a concept including a case where the amount of ultraviolet light transmitting the photomask is 0%. Illustratively, when the light-blocking pattern 290 is made of a positive photosensitive organic material, both the first portion 2911 and the second portion 2913 may be formed without being exposed to ultraviolet light in the process of manufacturing the light-blocking pattern 290. Or when the light-blocking pattern 290 is made of a negative photosensitive organic material, both the first portion 2911 and the second portion 2913 may be formed by exposure with the same level of light, for example, 100% of the amount of light. That is, in relation to the photomask (hereinafter referred to as the first photomask) used in the process of manufacturing the light-blocking pattern 290, both the mask pattern corresponding to the first portion 2911 and the mask pattern corresponding to the second portion 2913 may have the same light transmitting rate or light blocking rate. That is, in some embodiments, the first photomask may be a full tone mask. In this case, the amount of light provided in the process of forming the light-blocking member 220 may also be the same as the amount of light provided in the process of forming the first portion 2911 and the amount of light provided in the process of forming the second portion 2913.

In some embodiments, the first portion 2911 and the second portion 2913 may be formed by exposing them to different amounts of light in the manufacturing process. Illustratively, when the light-blocking pattern 290 is made of a positive photosensitive organic material, the amount of light provided in the process of forming the first portion 2911 may be smaller than the amount of light provided in the process of forming the second portion 2913. Further, when the light-blocking pattern 290 is made of a negative photosensitive organic material, the amount of light provided in the process of forming the first portion 2911 may be larger than the amount of light provided in the process of forming the second portion 2913. Thus, the thickness of the second portion, which has a relatively high possibility of step formation, may be reduced. That is, in the photomask (hereinafter referred to as the second photomask) used in the exposure process, the mask pattern corresponding to the first portion 2911 and the mask pattern corresponding to the second portion 2913 have different light transmitting rates or light blocking rates from each other. That is, in some embodiments, the second photomask may be a multi tone mask such as a half tone mask. In this case, the amount of light provided in the process of forming the light-blocking member 220 is the same as the amount of light provided in the process of forming the first portion 2911, but may be different from the amount of light provided in the process of forming the second portion 2913.

If the maximum height from the one surface of the first base substrate 110 to the upper surface of the connection electrode 91 is referred to as a first height H1 and if the maximum height from one surface (or upper surface) of the first base substrate 110 to the upper surface of the second portion 2913 of the light-blocking pattern 290 is referred to as a second height H2, in some embodiments, the difference Ha1 between the first height H1 and the second height H2 may in a range of 0 μm to 2 μm. Although it is shown in the drawing that the second height H2 is higher than the first height H1, this is only an example, and, in some embodiments, the second height H2 may be lower than the first height H1.

The conductive member CB may be disposed at a portion of the connection electrode 91, the portion being exposed by the opening 295. The conductive member CB is in contact with the connection electrode 91 and the common electrode 270. The common voltage provided to the voltage line 120 is transmitted to the common electrode 270 through the connection electrode 91 and the conductive member CB.

The conductive member CB may be made of a conductive material. For example, the conductive material may contain gold, copper, silver, and/or nickel.

The conductive member CB may be formed in a ball shape. That is, the conductive member CB may be a conductive ball. When the conductive member CB is formed in a ball shape, the diameter R of the conductive member CB may be in a range of 2 μm to 4 μm.

In some embodiments, the conductive member CB may be included within (or positioned inside) the sealing member 400. The conductive member CB may not be included in the sealing member 400, and may be a separate structure separated from the sealing member 400.

Figure 7:
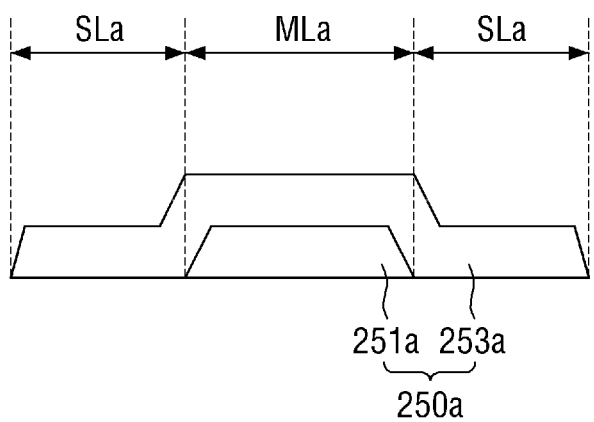
FIG. 7 and FIG. 8 are views showing the protrusion shown in FIG. 4 according to one or more embodiments.
Figure 8:
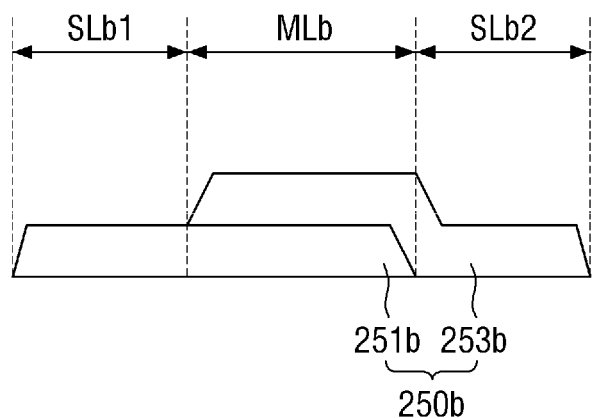

FIGS. 7 and 8 are views showing example embodiments of the protrusion shown in FIG. 4.

Referring to FIG. 7, in the protrusion 250a, unlike the protrusion 150 shown in FIG. 4, the width of the first pattern 251a may be smaller than the width of the second pattern 253a, and the second pattern 253a may completely cover the first pattern 251a. The multilayer portion MLa of the protrusion 250a may include the first pattern 251a and the second pattern 253a, and the single-layer portion SLa of the protrusion 250a may include only the second pattern 253a.

Referring to FIG. 8, in the protrusion 250b, unlike the protrusion 250a shown in FIG. 7, the second pattern 253b may cover a part of the first pattern 251b. The multilayer portion MLa of the protrusion 250b may include the first pattern 251b and the second pattern 253b, and the single-layer portions SLb1 and SLb2 of the protrusion 250b may include a first single-layer portion SLb1 including only the first pattern 251b and a second single-layer portion SLb2 including only the second pattern 253b.

Figure 9:
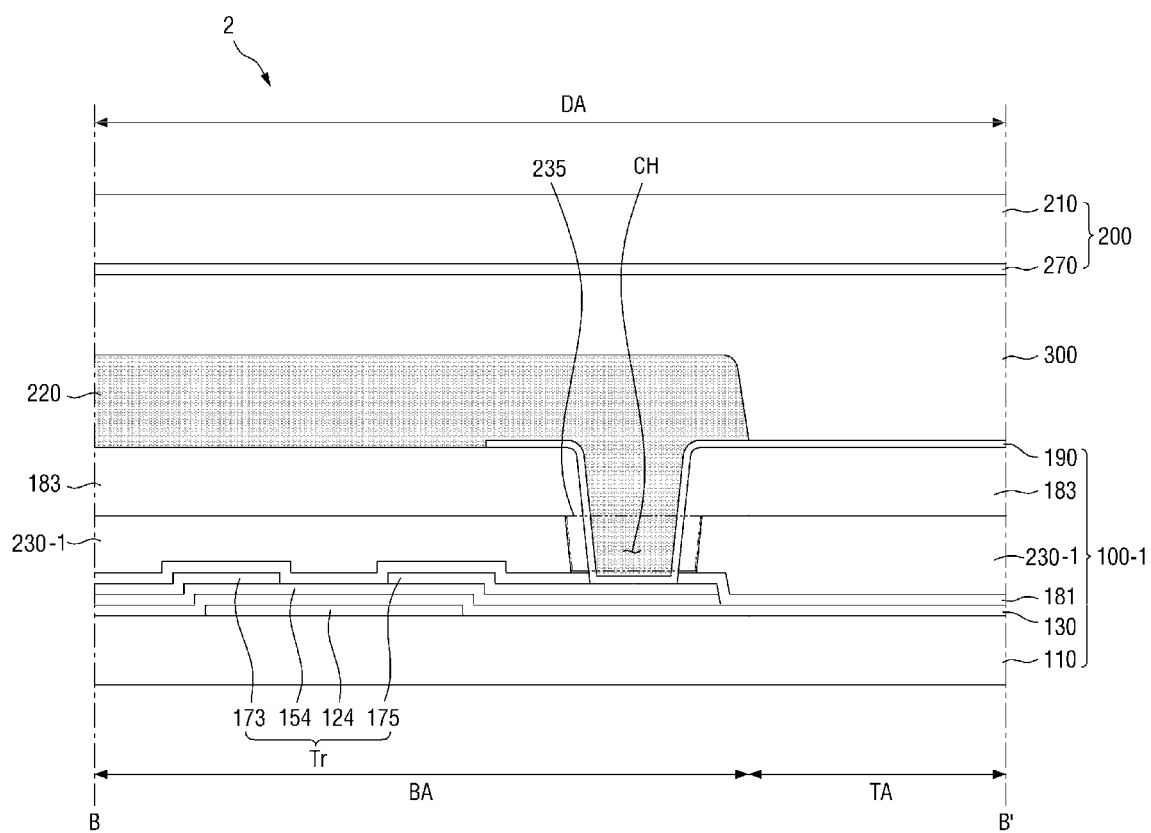
FIG. 9 is a sectional view of a display device according to an embodiment taken along a line analogous to the line B-B' of FIG. 3.

FIG. 9 is a sectional view of a display device 2 according to an embodiment taken along the line B-B' of FIG. 3.

The display device 2 includes a first display panel 100-1, a second display panel 200 facing the first display substrate 100-1, a sealing member (400 of FIG. 4) attaching the first display panel 100-1 and the second display panel 200 together, and a liquid crystal layer 300 disposed between the first display panel 100-1 and the second display panel 200.

The structure of the display area DA of the display device 2 is different from the structure of the display area DA of the display device (1 of FIGS. 1 to 6) shown in FIGS. 1 to 8. Other components of the display device 2 may be substantially the same as those of the display device 1. Therefore, description may not be unnecessarily repeated, and differences are mainly described.

A color filter 230-1 may be disposed on the passivation layer 181. The color filter 230-1 may overlap the light-transmitting area TA. Further, the color filter 230-1 may overlap the light-blocking area BA, and may partially cover the thin film transistor Tr. In some embodiments, the color filter may be provided with an opening 235 corresponding to the contact hole CH formed in the organic layer 183 and the passivation layer. In some embodiments, the width of the opening 235 may be larger than the width of the contact hole CH, and the lateral surface of the color filer 230-1, defining the opening 235, may be in contact with the organic layer 183.

Other configurations of the first display panel 100-1 may be substantially the same as those of the first display panel (100 of FIGS. 1 to 6) described with reference to FIGS. 1 to 6.

Figure 10:
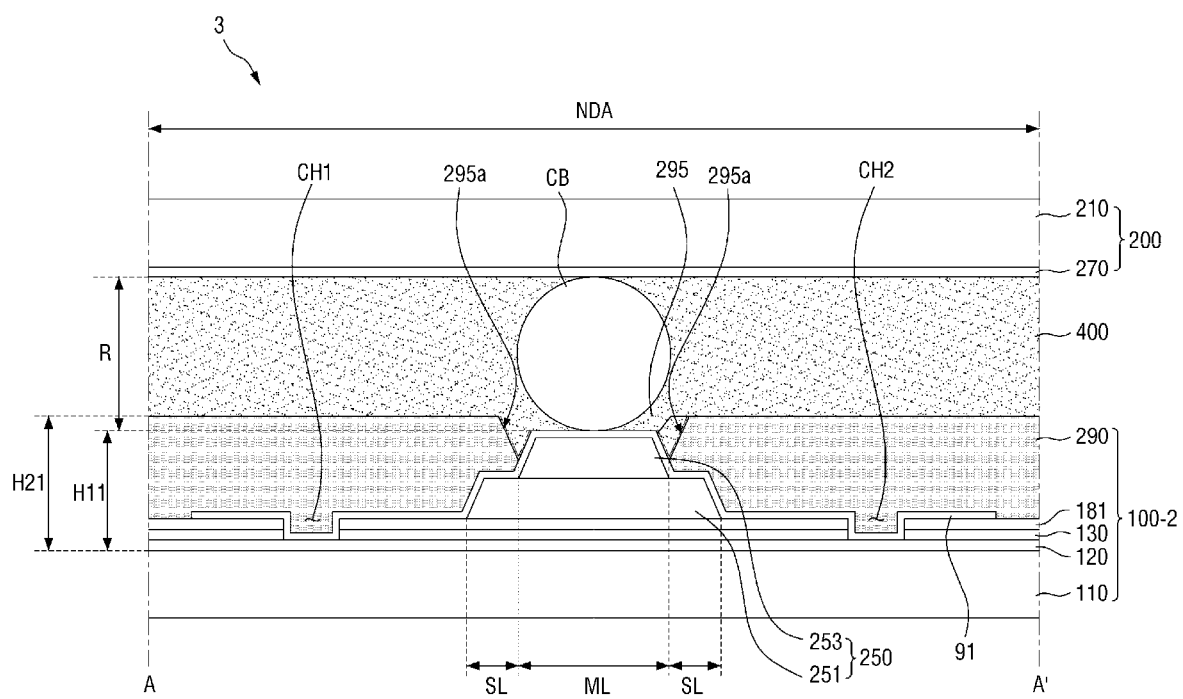
FIG. 10 is a sectional view of a display device according to an embodiment taken along a line analogous to the line A-A' of FIG. 2.
Figure 11:
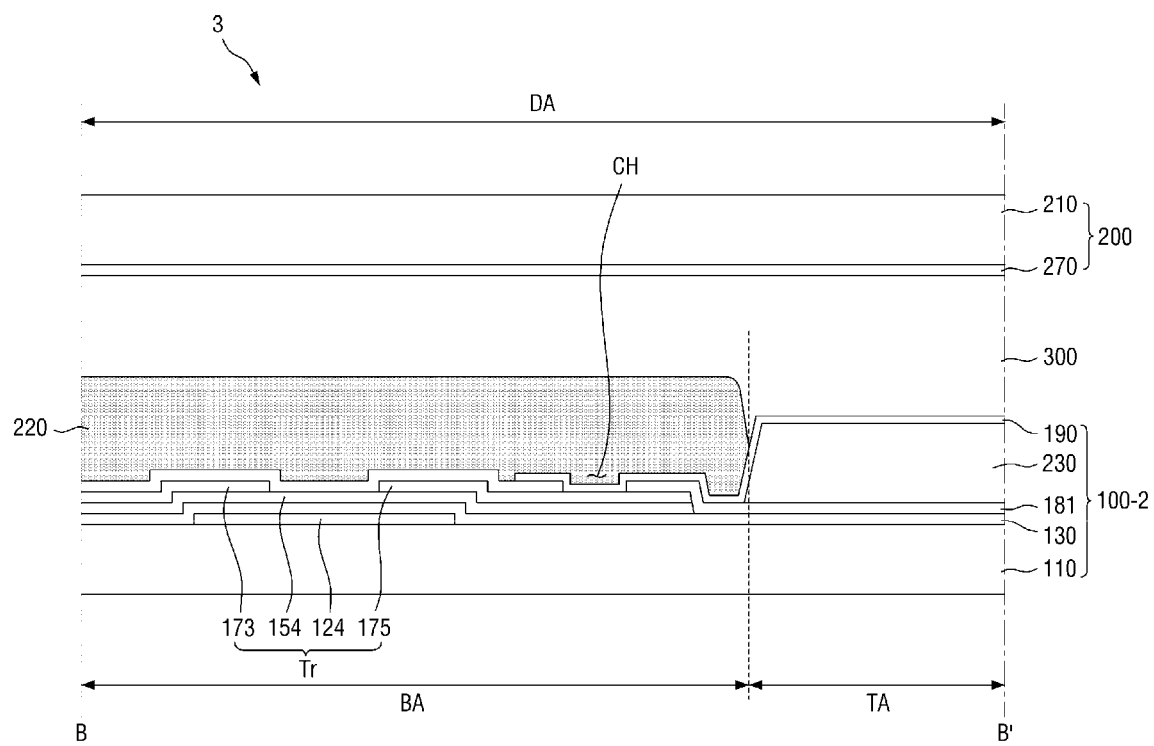
FIG. 11 is a sectional view of a display device according to an embodiment taken along a line analogous to the line B-B' of FIG. 3.

FIG. 10 is a sectional view of a display device 3 according to an embodiment taken along the line A-A' of FIG. 2, and FIG. 11 is a sectional view of a display device according to an embodiment taken along the line B-B' of FIG. 3.

Referring to FIGS. 10 and 11, the display device 3 includes a first display panel 100-2, a second display panel 200 facing the first display substrate 100-2, a sealing member 400 attaching the first display panel 100-2 and the second display panel 200 together, and a liquid crystal layer 300 disposed between the first display panel 100-2 and the second display panel 200.

The display device 3 is different from the display device (1 of FIGS. 1 to 6) described with reference to FIGS. 1 to 6 in that this display device 3 does not include the organic layer (183 of FIGS. 1 to 6). Other components of display device 3 may be substantially the same as those of the display device 1. Therefore, description may not be unnecessarily repeated, and differences are mainly described.

The first display panel 100-2, unlike the first display panel (1 of FIGS. 1 to 6) described with reference to FIGS. 1 to 6, does not an organic layer. Thus, in the peripheral area NDA, the connection electrode 91 is disposed on the passivation layer 181 to be in contact the upper surface of the passivation layer 181. Further, the connection electrode 91 may be disposed directly on the protrusion 250 to be in direct contact with the protrusion 250.

In an embodiment, in the light-blocking area BA of the display area DA, the pixel electrode 190 may be disposed on the passivation layer 181 to be in contact with the upper surface of the passivation layer 181. Further, in the light-transmitting area TA of the display area, the pixel electrode 190 is disposed on the color filter 230 to be in contact with the upper surface of the color filter 230.

If the maximum height from the one surface of the first base substrate 110 to the upper surface of the connection electrode 91 is referred to as a first height H11 and if the maximum height from one surface (or upper surface) of the first base substrate 110 to the upper surface of the second portion 2913 of the light-blocking pattern 290 is referred to as a second height H21, in some embodiments, the difference Ha1 between the first height H11 and the second height H21 may be in a range of 0 μm to 2 μm. As described above, the second portion 2913 of the light-blocking pattern 290 is a portion that overlaps the connection electrode 91 and the single-layer portion SL of the protrusion 250 in the light-blocking pattern 290.

Other configurations of the first display panel 100-2 may be substantially the same as those of the first display panel (100 of FIGS. 1 to 6) described with reference to FIGS. 1 to 6.

Figure 12:
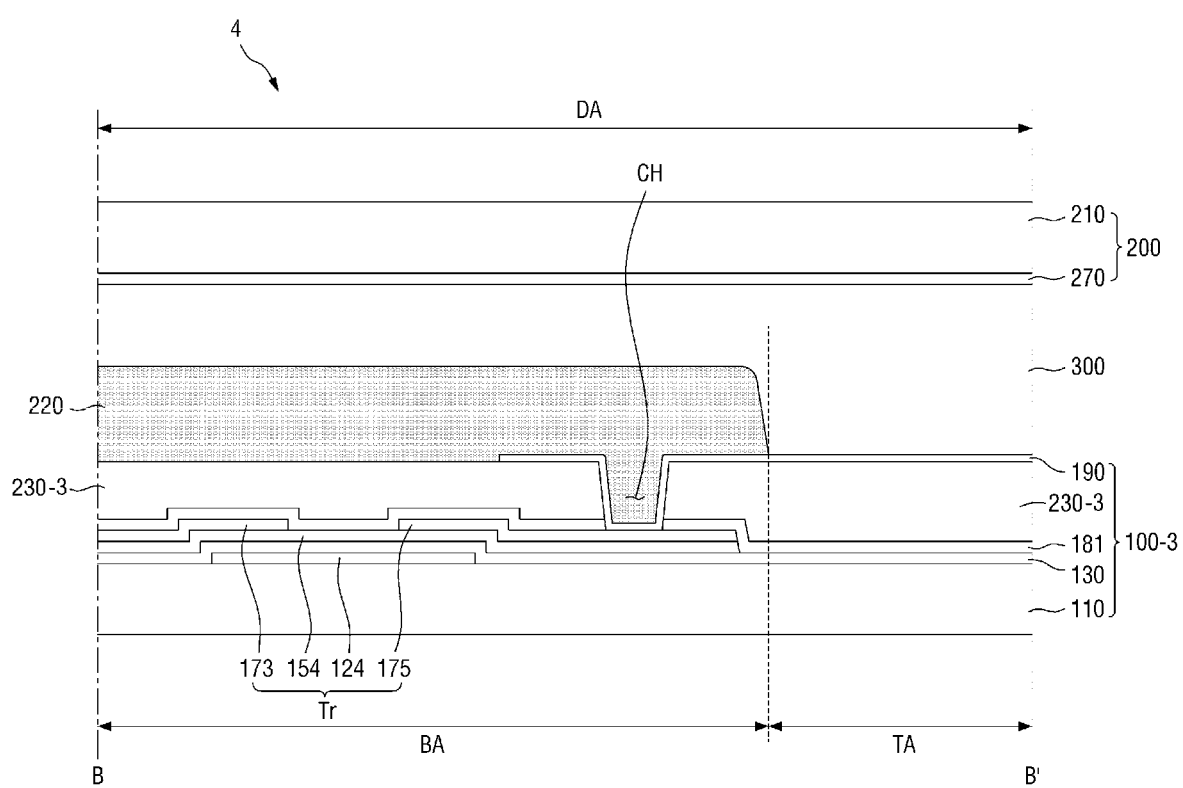
FIG. 12 is a sectional view of a display device according to an embodiment taken along a line analogous to the line B-B' of FIG. 3.

FIG. 12 is a sectional view of a display device 4 according to an embodiment taken along the line B-B' of FIG. 3.

Referring to FIG. 12, the display device 4 includes a first display panel 100-3, a second display panel 200 facing the first display substrate 100-3, a sealing member 400 attaching the first display panel 100-3 and the second display panel 200, and a liquid crystal layer 300 disposed between the first display panel 100-3 and the second display panel 200.

The structure of the display area DA of the display device 4 is different from the structure of the display area DA of the display device (3 of FIGS. 10 and 11) shown in FIGS. 10 and 11. Other components of the display device may be substantially the same as those of display device 3. Therefore, description may not be unnecessarily repeated, and differences are mainly described.

A color filter 230-3 may be disposed on the passivation layer 181. The color filter 230-3 may overlap the light-blocking area BA as well as the light-transmitting area TA, and may partially cover the thin film transistor Tr. Therefore, the upper surface of the color filter 230-3 in the light-blocking area BA may be in contact with the light-blocking member 220. In some embodiments, a contact hole CH is formed in the color filter 230-3 and the passivation layer 181, and the pixel electrode 190 is connected with the thin film transistor Tr and the drain electrode 175 through the contact hole CH.

In an embodiment, the protrusion 250 of each of the display devices of FIGS. 9 to 13 may be modified into the protrusion (250a of FIG. 7) described with reference to FIG. 7 or the protrusion (250b of FIG. 8) described with reference to FIG. 8.

Figure 13:
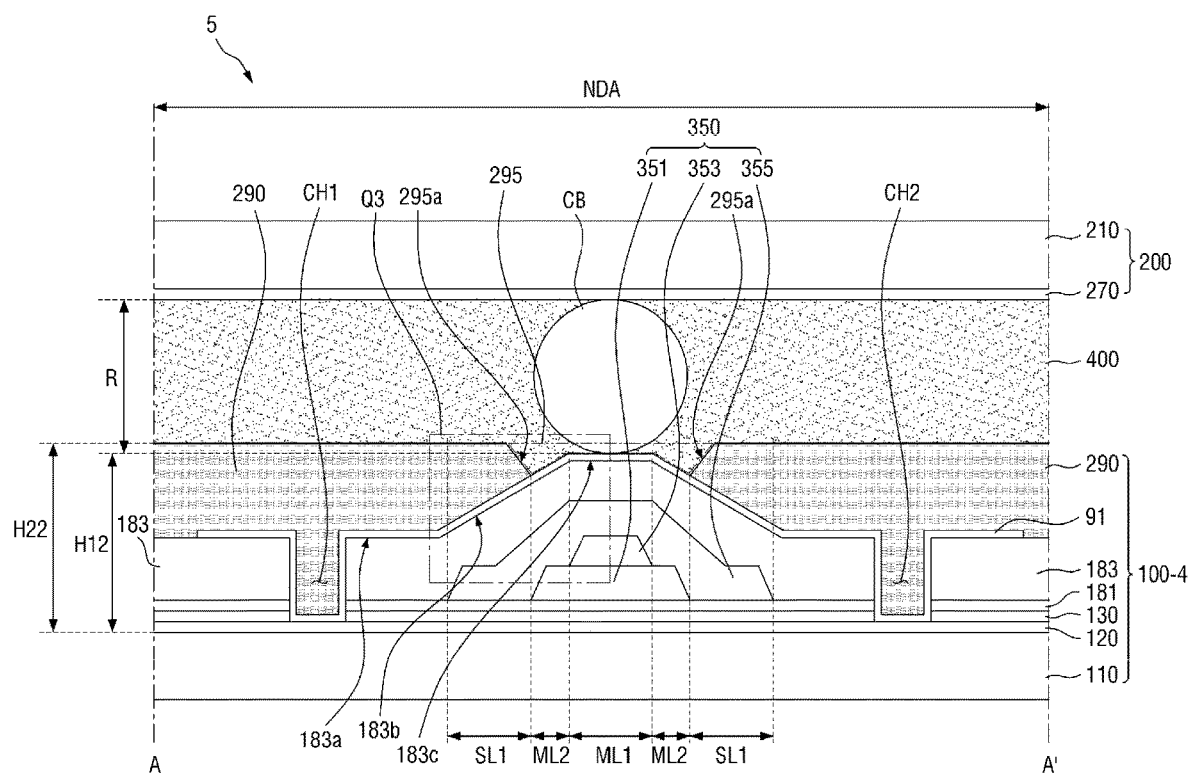
FIG. 13 is a sectional view of a display device according to an embodiment taken along a line analogous to the line A-A' of FIG. 2.
Figure 14:
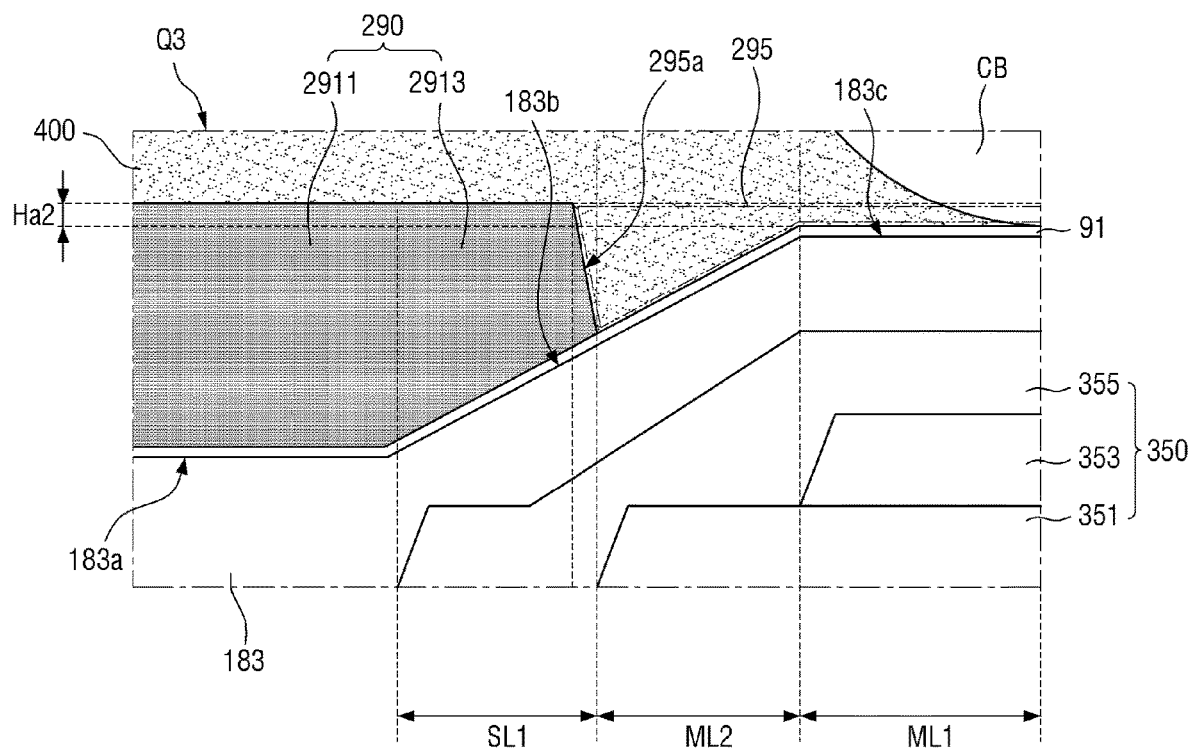
FIG. 14 is an enlarged plan view of the portion Q3 of FIG. 13 according to an embodiment.
Figure 15:
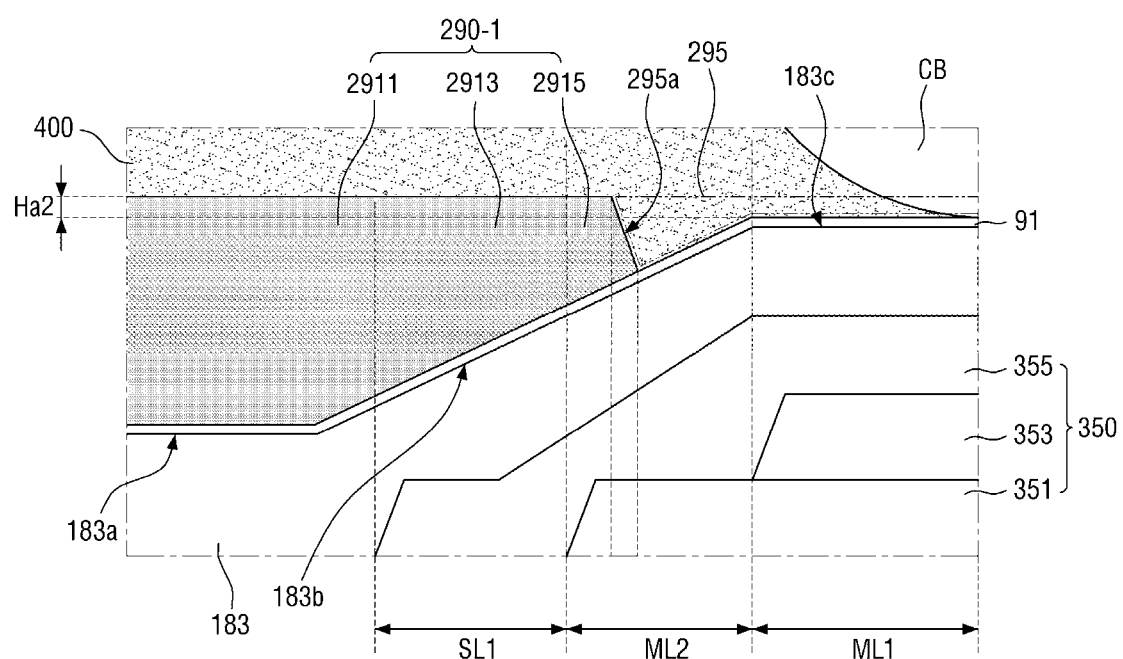
FIG. 15 and FIG. 16 are views showing the portion Q3 of FIG. 13 according to one or more embodiments.
Figure 16:
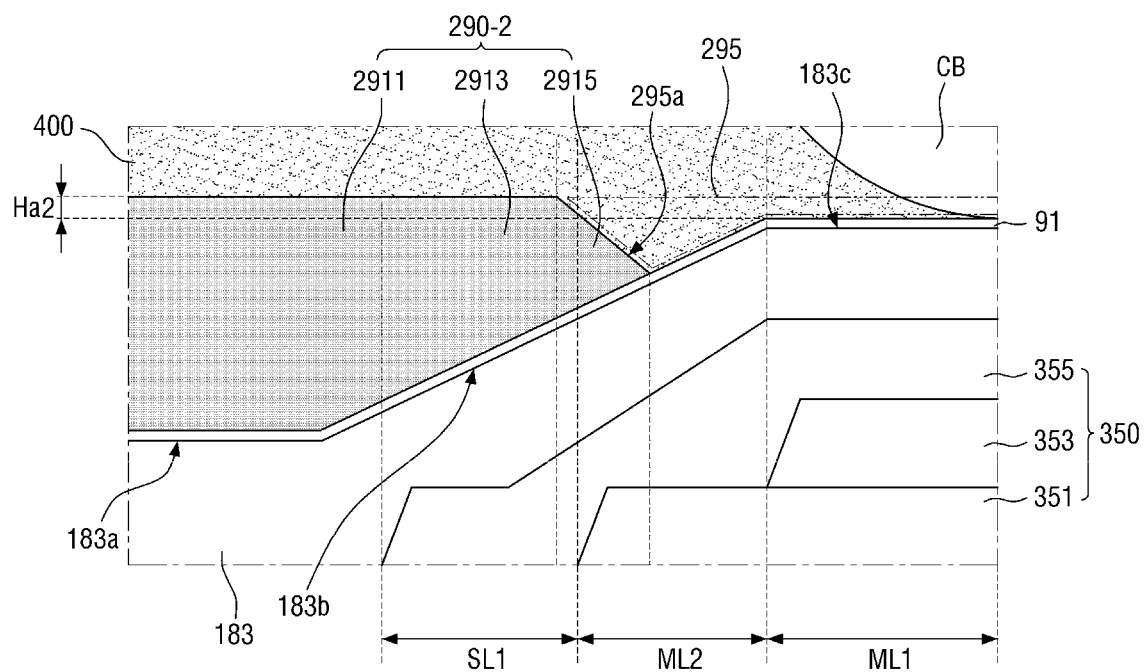

FIG. 13 is a sectional view of a display device 5 according to an embodiment taken along the line A-A' of FIG. 2, FIG. 14 is an enlarged plan view of the portion Q3 of FIG. 13, and FIGS. 15 and 16 are views showing example embodiments of FIG. 14.

Referring to FIGS. 13 and 14, the display device 5 includes a first display panel 100-4, a second display panel 200 facing the first display substrate 100-4, a sealing member 400 attaching the first display panel 100-4 and the second display panel 200 together, and a liquid crystal layer (300 of FIGS. 1 to 6) disposed between the first display panel 100-4 and the second display panel 200.

The display device 5 is different from the display device (1 of FIGS. 1 to 6) described with reference to FIGS. 1 to 6 in that the structure of a protrusion 350 is different from the structure of the protrusion 250 of the display device (1 of FIGS. 1 to 6). Other components of display device 5 may be substantially the same as those of the display device 1. Therefore, description may not be unnecessarily repeated, and differences are mainly described.

A protrusion 350 is disposed on the passivation layer 181 in the peripheral area NDA of the first base substrate.

The protrusion 350 may include a first pattern 351 (or a third member), a second pattern 353 (or a second member), and a third pattern 355 (or a first member). The first pattern 351, the second pattern 353, and the third pattern 355 may overlap each other. The laminating order of the first pattern 351, the second pattern 353, and the third pattern 355 may be configured different according to different embodiments. Illustratively, as shown in FIG. 13, the first pattern 351 may disposed on the passivation layer 181, the second pattern 353 may be disposed on the first pattern 351, and the third pattern 355 may be disposed on the second pattern 353.

In some embodiments, the width of the first pattern 351 may be greater than the width of the second pattern 353, and the width of the third pattern 355 may be greater than the width of the first pattern 351 and the width of the second pattern 253. Therefore, in some embodiments, the third pattern 355 may cover the first pattern 351 and the second pattern 353.

The first pattern 351 may be made of a photosensitive organic insulating material including a first color material.

The second pattern 353 may be made of a photosensitive organic insulating material including a second color material. The second color material may be a color material different from the first color material contained in the first pattern 351.

The third pattern 355 may be made of a photosensitive organic insulating material including a third color material. The third color material may be a color material different from the first color material contained in the first pattern 351 and the second color material contained in the second pattern 353.

For example, when the first pattern 351 contains a red colorant as the first color material and when the second pattern 353 contains a green colorant as the second color material, the third pattern 355 may contain a blue colorant as the third color material.

In some embodiments, the color material contained in the color filter 230 may be the same as at least one of the first color material, the second color material, and the third color material.

When the display device 5 includes a red filter, a green filter, and a blue filter, examples of color material combinations of the first pattern 351, the second pattern 353, and the third pattern 355 are as follows. Each of the following parentheses represents one color material combination. In each of the parentheses, the first color material of the first pattern 351, the second color material of the second pattern 353, the third color material of the third pattern 355, and a color material of a color filter are sequentially described. Here, R means a red colorant, G means a green colorant, and B means a blue colorant.

(R, G, B, R), (R, G, B, G), (R, G, B, B), (R, B, G, R), (R, B, G, G), (R, B, G, B), (G, R, B, R), (G, R, B, G), (G, R, B, B), (G, B, R, R), (G, B, R, G), (G, B, R, B), (B, R, G, R), (B, R, G, G), (B, R, G, B), (B, G, R, R), (B, G, R, G), (B, G, R, B)

The protrusion 350 may overlap the voltage line 120.

If portions of the protrusions 350 are identified based on the overlapping relationship among the first pattern 351, the second pattern 353, and the third pattern 355, the protrusion 350 may include a first multilayer portion ML1 where all the first pattern 351, the second pattern 353, and the third pattern 355 overlap each other, may include a second multilayer portion ML2 where only two patterns selected from among the first pattern 351, the second pattern 353, and the third pattern 355 overlap each other, and may include a single-layer portion SL1 where the first pattern 351, the second pattern 353, and the third pattern 355 do not overlap each other. In some embodiments, the single-layer portion SL1 may be composed of only the third pattern 355.

The first multilayer portion ML1 and the second multilayer portion ML2 may overlap the voltage line 120. Thus, the external light incident on the voltage line 120 and the light reflected by the voltage line 120 can be effectively blocked or absorbed.

In some embodiments, the single-layer portion SL1 may also overlap the voltage line 120, thereby partially blocking or absorbing the external light incident on the voltage line 120 and the light reflected by the voltage line 120.

Since the single-layer portion SL1 may overlap the light-blocking pattern 290, the width of the single-layer portion SL1 may be in a range of 4 μm to 7.5 μm in order to ensure process margin (or overlap margin).

Further, in some embodiments, the sum of the width of the single-layer portion SL1 and the width of the second multilayer portion ML2 may be in a range of 10 μm to 20 μm.

The organic layer 183 for covering the protrusion 350 may be disposed on the passivation layer 181. A first hole CH1 and second hole CH2 for partially exposing the voltage line 120 may be formed in the organic layer 183, the passivation layer 181, and the gate insulating layer 130.

In the peripheral area NDA, the organic layer 183 may include a first upper surface 183a, a second upper surface 183c, and a third upper surface 183b connecting the first upper surface 183a and the second upper surface 183c.

The first upper surface 183a is a portion of the upper surface of the organic layer 183 that does not overlap the protrusion 350 in the peripheral area NDA, particularly, the connection region SP. The first upper surface 183a may be disposed between the first hole CH1 and the protrusion 350 or between the second hole CH2 and the protrusion 350. In some embodiments, the first upper surface 183a may be a flat surface. In an embodiment, the first upper surface 183a may include a curved surface.

The second upper surface 183c overlaps the first multilayer portion ML1 of the protrusion 350 in the upper surface of the organic layer 183. The second upper surface 183c, as described above, includes a point at which the spacing distance from one surface (illustratively, upper surface) of the first base substrate 110 to the upper surface of the organic layer 183 is the greatest, that is, an apex.

The third upper surface 183b is a portion of the upper surface of the organic layer 183 connected to the first upper surface 183a and the second upper surface 183c. The third upper surface 183b may not overlap the first multilayer portion ML1 of the protrusion 350, and may overlap the single-layer portion SL1 and second multilayer portion ML2 of the protrusion 350.

The connection electrode 91 may be disposed on the organic layer 183. The connection electrode 91 may be electrically connected to the voltage line 120 through at least one of the first hole CH1 and the second hole CH2. The connection electrode 91 may be disposed on the first upper surface 183a, second upper surface 183c and third upper surface 183b of the organic layer 183.

The light-blocking pattern 290 is disposed on the organic layer 183 and the connecting electrode 91. The light-blocking pattern 290 may cover the first hole CH1 and the second hole CH2.

The light-blocking pattern 290 may be formed from the same layer as the light-blocking member 220.

The opening 295 for partially exposing the connection electrode 91 may be formed in the light-blocking pattern 290, and the lateral surface 295a of the light-blocking pattern 290 around the opening 295 may define the opening 295. The opening 295 may expose a portion overlapping the first multilayer portion ML1 of the connection electrode 91 or a portion of the connection electrode 91 located on the second upper surface 183c of the organic layer 183.

Considering the relationship between the light-blocking pattern 290 and the protrusion 350, the lateral surface 295a of the light-blocking pattern 290, defining the opening 295, may overlap the single-layer portion SL1, as shown in FIG. 14. In some embodiments, the light-blocking pattern 290 may completely cover the single-layer portion SL1. That is, the entire single-layer portion SL1 may overlap the light-blocking pattern 290.

In some embodiments, the lateral surface 295a of the light-blocking pattern 290, defining the opening 295, may overlap the single-layer portion SL1 while not overlapping the first multilayer portion ML1 and the second multilayer portion ML2, as shown in FIG. 14.

In some embodiments, the lateral surface 295a of a light-blocking pattern 290-1, defining the opening 295, may overlap the second multilayer portion ML2 while not overlapping the first multilayer portion ML1 and the single-layer portion SL1, as shown in FIG. 15. In this case, the light-blocking pattern 290-1 may include not only a first portion 2911 overlapping the connection electrode 91 and not overlapping the protrusion 350 and a second portion 2913 connected with the first portion 2911 and overlapping the single-layer portion SL1 of the protrusion 350 but also a third portion 2915 connected with the second portion 2913 and overlapping the second multilayer portion ML2. The lateral surface 295a of the light-blocking pattern 290-1, defining the opening 295, may be one surface of the third portion 2915.

In some embodiments, the lateral surface 295a of a light-blocking pattern 290-2, defining the opening 295, may overlap the single-layer portion SL1 and the second multilayer portion ML2 while not overlapping the first multilayer portion ML1, as shown in FIG. 16. In this case, the light-blocking pattern 290-2 may include the above-described first portion 2911, second portion 2913 and third portion 2915. The lateral surface 295a of the light-blocking pattern 290-2, defining the opening 295, may be a part of one surface of the second portion 2913 and one surface of the third portion 2915.

Since the light-blocking pattern 290 overlaps the single-layer portion SL1 of the protrusion 350, the light-blocking pattern 290 can block the reflected light due to the voltage line 120. Further, since the light-blocking pattern 290 is formed not to overlap the first multilayer portion ML1 of the protrusion 350, the step of the light-blocking pattern 290 formed by the protrusion 350 is minimized, thereby preventing the deterioration in display quality of the display device 1 due to the non-uniform spreading of liquid crystals. Furthermore, since the light-blocking pattern 290 improves the contact failure of the conductive member CB, the connection reliability between the common electrode 270 and the connection electrode 91 can be increased, and the display quality in the peripheral area can be improved.

The first portion 2911 in the light-blocking pattern 290 overlaps the connection electrode 91 while not overlapping the protrusion 350, and the second portion 2913 in the light-blocking pattern 290 is connected with the first portion 2911 and overlaps the connection electrode 91 and the single-layer portion SL1. The amount of light provided in the process of forming the first portion 2911 and the amount of light provided in the process of forming the second portion 2913 may be the same as each other.

However, this is only an example, and, in some embodiments, the first portion 2911 and the second portion 2913 may be formed by exposing them to different amounts of light in the manufacturing process.

If the maximum height from the one surface of the first base substrate 110 to the upper surface of the connection electrode 91 is referred to as a first height H12 and if the maximum height from one surface (or upper surface) of the first base substrate 110 to the upper surface of the second portion 2913 of the light-blocking pattern 290 is referred to as a second height H22, in some embodiments, the difference Ha1 between the first height H12 and the second height H22 may be in a range of 0 μm to 2 μm.

The relationship between the light-blocking pattern 290 and the first upper surface 183a, second upper surface 183b and third upper surface 183c of the organic layer 183 is the same as that described with reference to FIGS. 1 to 6.

The structure of the display area DA of the display device 5 is substantially the same as the structure of the display area DA of the display device (1 of FIG. 8) or the structure of the display area DA of the display device (2 of FIG. 9).

FIGS. 17, 18, 19, 20, 21, 22, 23, 24, 25, 26, and 27 are views showing example embodiments of the protrusion shown in FIG. 13.

Figure 17:
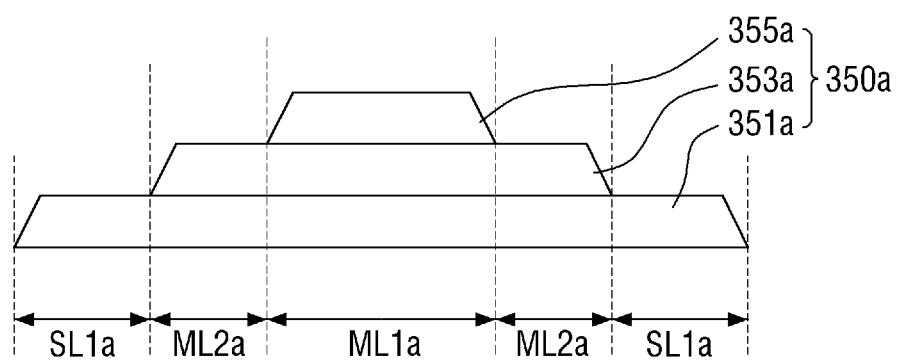
FIG. 17, FIG. 18, FIG. 19, FIG. 20, FIG. 21, FIG. 22, FIG. 23, FIG. 24, FIG. 25, FIG. 26, and FIG. 27 are views showing the protrusion shown in FIG. 13 according to one or more embodiments.

Referring to FIG. 17, in the protrusion 350a, unlike the protrusion (350 of FIG. 13) shown in FIG. 13, the width of the first pattern 351a may be greater than the width of the second pattern 353a, and the width of the third pattern 355a may be smaller than the width of the second pattern 353a. The first multilayer portion ML1a of the protrusion 350a may include the first pattern 351a, the second pattern 353a, and the third pattern 355a, the second multilayer portion ML2a of the protrusion 350a may include the first pattern 351a and the second pattern 353a, and the single-layer pattern SL1a of the protrusion 350a may include only the first pattern 351a.

Figure 18:
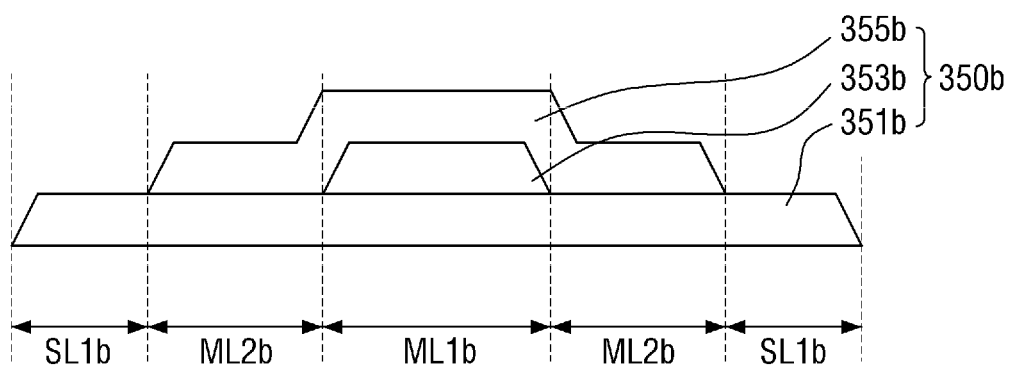

Referring to FIG. 18, in the protrusion 350b, unlike the protrusion (350 of FIG. 13) shown in FIG. 13, the width of the first pattern 351b may be greater than the width of the second pattern 353b and the width of the third pattern 355b, and the width of the second pattern 353b may be smaller than the width of the third pattern 355b. The third pattern 355b may completely cover the second pattern 353b. The first multilayer portion ML1b of the protrusion 350b may include the first pattern 351b, the second pattern 353b, and the third pattern 355b, the second multilayer portion ML2b of the protrusion 350b may include the first pattern 351b and the third pattern 355b, and the single-layer pattern SL1b of the protrusion 350b may include only the first pattern 351b.

Figure 19:
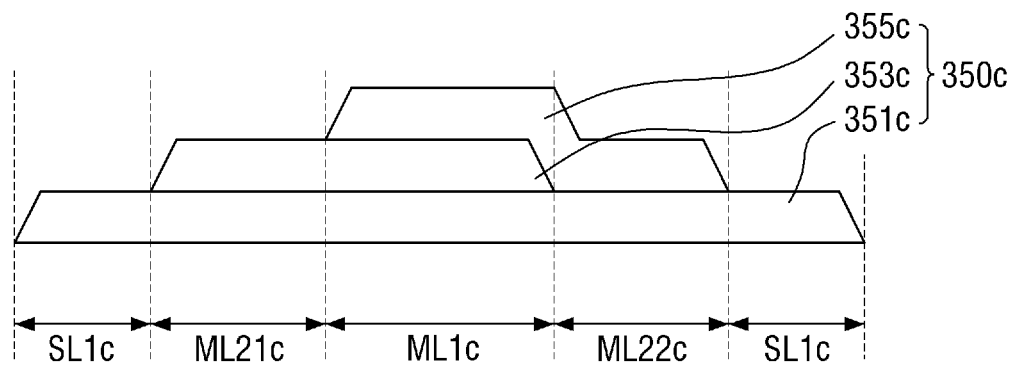

Referring to FIG. 19, in the protrusion 350c, unlike the protrusion (350b of FIG. 18) shown in FIG. 18, the third pattern 355c may partially cover the second pattern 353c. The first multilayer portion ML1c of the protrusion 350c may include the first pattern 351c, the second pattern 353c, and the third pattern 355c. The second multilayer portions ML21c and ML22c of the protrusion 350c may include a first portion ML21c including the first pattern 351c and the second pattern 353c, and a second portion ML22c including the first pattern 351c and the third pattern 355c.

Figure 20:
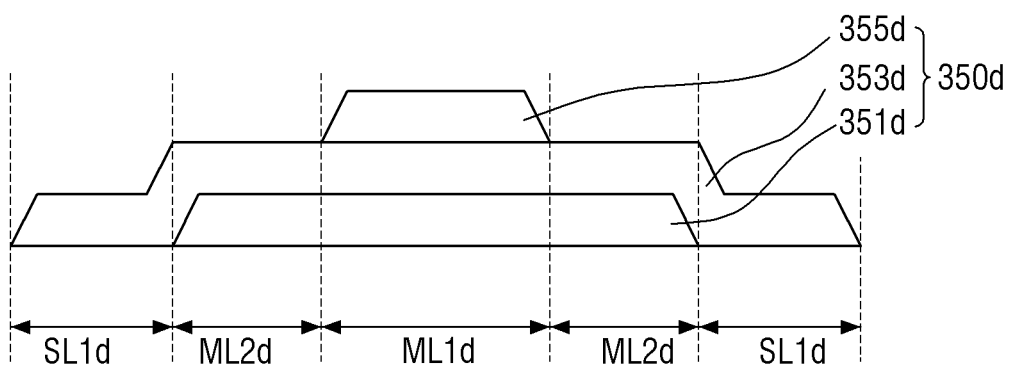

Referring to FIG. 20, in the protrusion 350d, unlike the protrusion (350 of FIG. 13) shown in FIG. 13, the width of the first pattern 351d may be smaller than the width of the second pattern 353d, and may be greater than the width of the third pattern 355d. The width of the third pattern 355d may be smaller than the width of the first pattern 351d and the width of the second pattern 353d. The second pattern 353d may completely cover the first pattern 351d. The first multilayer portion ML1d of the protrusion 350d may include the first pattern 351d, the second pattern 353d, and the third pattern 355d, the second multilayer portion ML2d of the protrusion 350d may include the first pattern 351d and the second pattern 353d, and the single-layer pattern SL1d of the protrusion 350d may include only the second pattern 351d.

Figure 21:
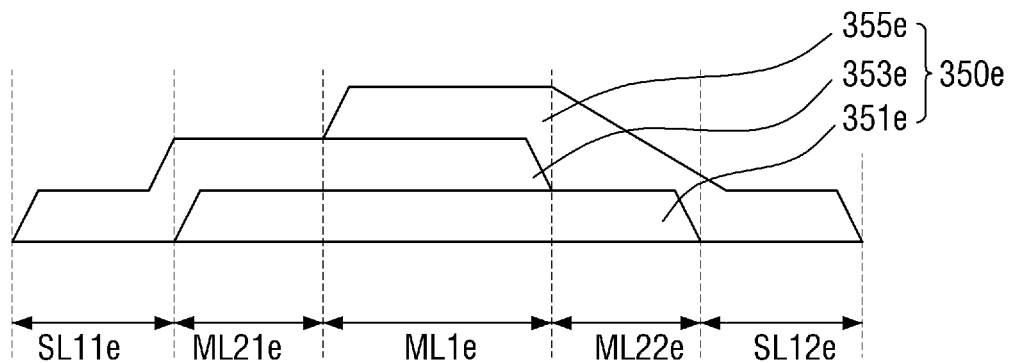

Referring to FIG. 21, in the protrusion 350e, unlike the protrusion (350d of FIG. 20) shown in FIG. 20, the second pattern 353e may partially cover the first pattern 351e. The third pattern 355e may cover a portion of the first pattern 351e, the portion being not covered by the second pattern 353e, and a part of the second pattern 353e. The first multilayer portion ML1e of the protrusion 350e may include the first pattern 351e, the second pattern 353e, and the third pattern 355e. The second multilayer portions ML21e and ML22e of the protrusion 350e may include a first portion ML21e including the first pattern 351e and the second pattern 353e, and a second portion ML22e including the first pattern 351e and the third pattern 355e. The single-layer portions SL11e and SL112E may include a first portion including only the second pattern 353e and a second portion including only the third pattern 355e.

Figure 22:
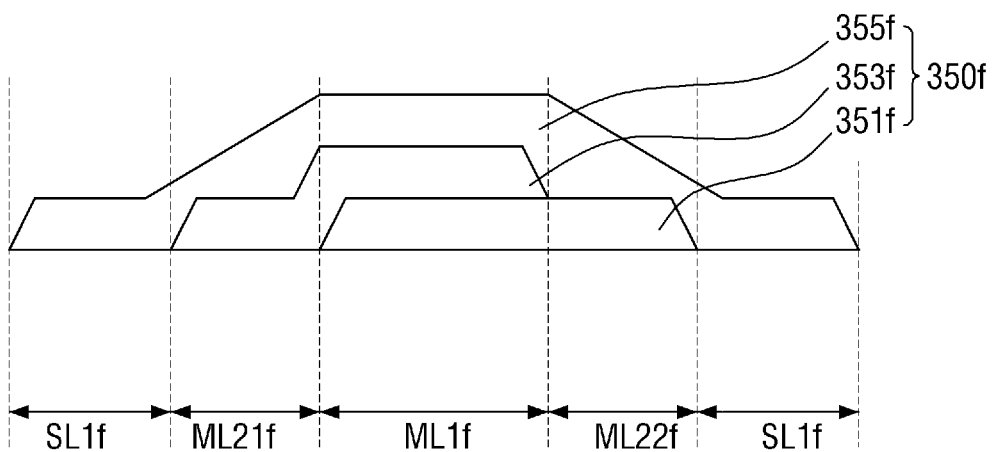

Referring to FIG. 22, in the protrusion 350f, unlike the protrusion (350e of FIG. 21) shown in FIG. 21, the third pattern 355f may completely cover the first pattern 351f and the second pattern 353f. The first multilayer portion ML1f of the protrusion 350f may include the first pattern 351f, the second pattern 353f, and the third pattern 355f. The second multilayer portions ML21f and ML22f of the protrusion 350f may include a first portion ML21f including the second pattern 353f and the third pattern 355f, and a second portion ML22f including the first pattern 351f and the third pattern 355f. The single-layer portion SL1f may include only the third pattern 355f.

Figure 23:
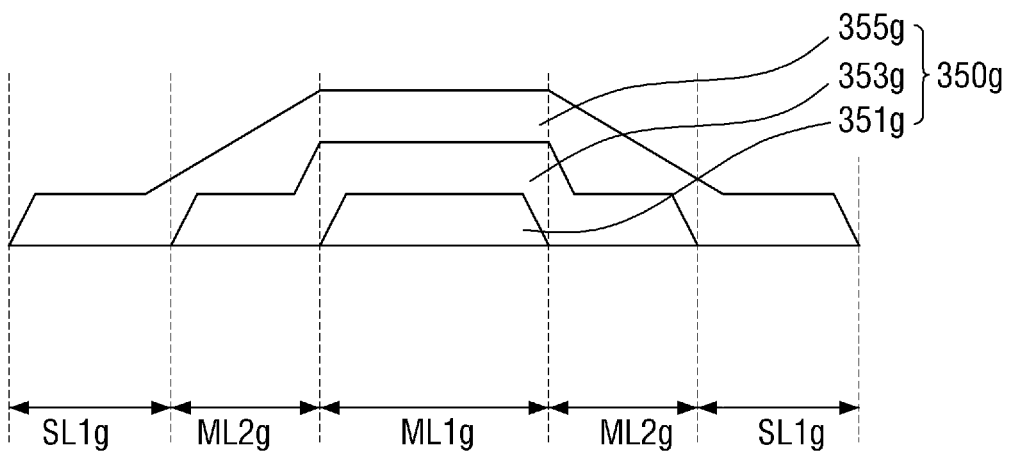

Referring to FIG. 23, in the protrusion 350g, unlike the protrusion (350 of FIG. 13) shown in FIG. 13, the width of the first pattern 351g may be smaller than the width of the second pattern 353g. The width of the third pattern 355g may be greater than the width of the first pattern 351g and the width of the second pattern 353g. The first multilayer portion ML1g of the protrusion 350g may include the first pattern 351g, the second pattern 353g, and the third pattern 355g, the second multilayer portion ML2g of the protrusion 350g may include the second pattern 353d and the third pattern 355g, and the single-layer pattern SL1g of the protrusion 350g may include only the third pattern 355g.

Figure 24:
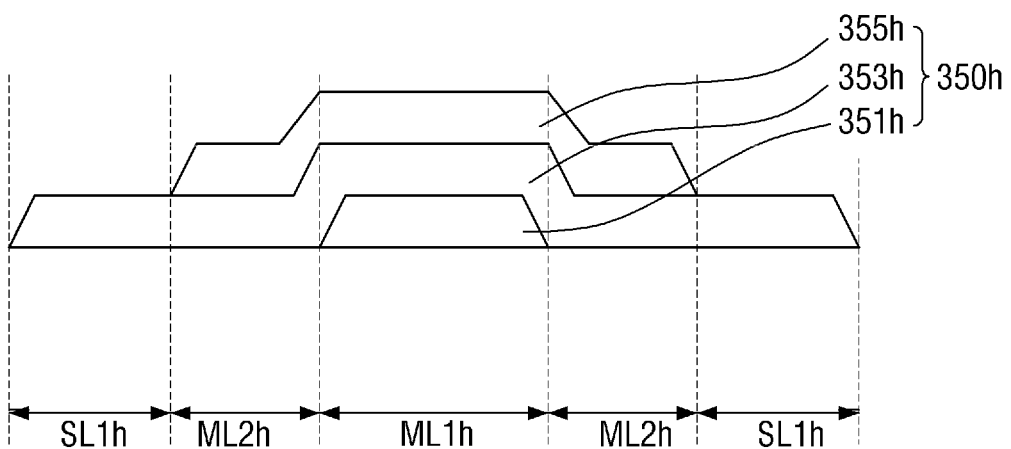

Referring to FIG. 24, in the protrusion 350h, unlike the protrusion (350g of FIG. 23) shown in FIG. 23, the width of the first pattern 351h may be smaller than the width of the second pattern 353h. The width of the second pattern 353h may be greater than the width of the third pattern 355h. The first multilayer portion ML1h of the protrusion 350h may include the first pattern 351h, the second pattern 353h, and the third pattern 355h, the second multilayer portion ML2h of the protrusion 350h may include the second pattern 353h and the third pattern 355h, and the single-layer pattern SL1h of the protrusion 350h may include only the third pattern 355h.

Each of the protrusions described with reference to FIGS. 17 to 24 includes a second multilayer portion which is a portion where two patterns selected from a first pattern, a second pattern and a third pattern overlap each other. Each of the protrusions described with reference to FIGS. 17 to 24 may be applied to a structure of the display device shown in FIGS. 13 to 16, that is, a structure where the light-blocking member overlaps only the single-layer portion of the protrusion or overlaps the second multilayer portion of the protrusion.

Figure 25:
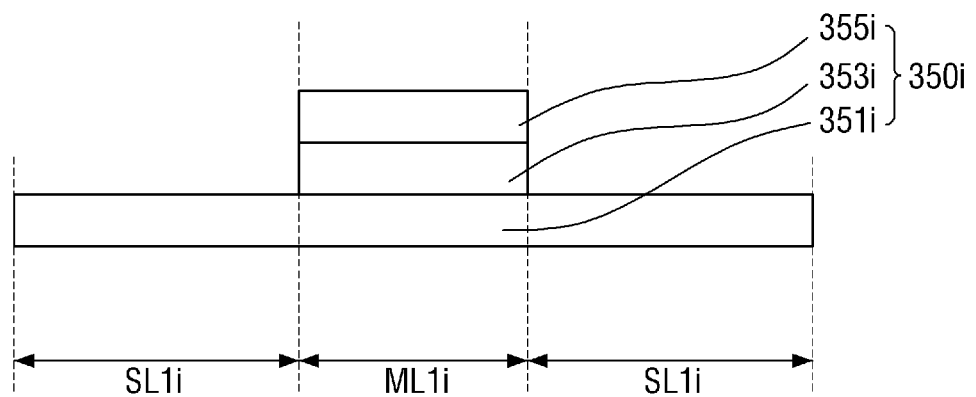

Referring to FIG. 25, in the protrusion 350i, unlike the protrusion (350 of FIG. 13) shown in FIG. 13, the width of the first pattern 351i may be greater than the width of the second pattern 353i and the width of the third pattern 355i, and the width of the second pattern 353i may be substantially the same as the width of the third pattern 355i. In this case, the protrusion 350i may not include a second multilayer portion, that is, a portion where two patterns selected from the first pattern 351i, the second pattern 353i, and the third pattern 355i overlap each other. The first multilayer portion ML1i of the protrusion 350i may include the first pattern 351i, the second pattern 353i, and the third pattern 355i, and the single-layer pattern SL1i of the protrusion 350i may include only the first pattern 351i.

Figure 26:
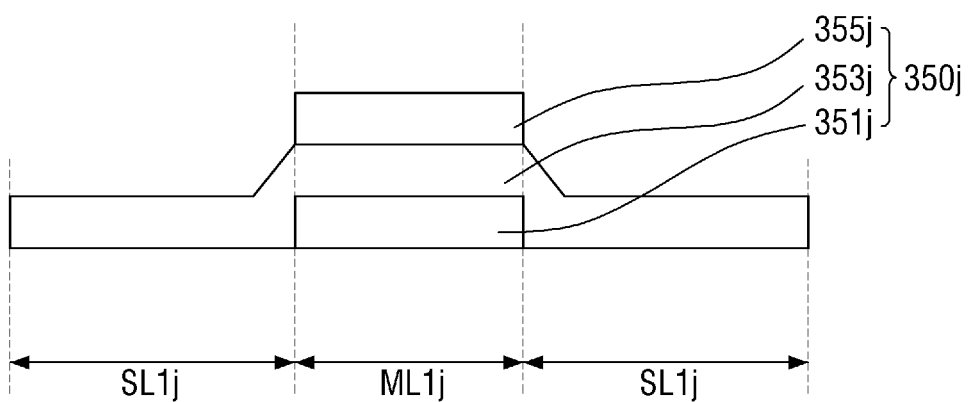

Referring to FIG. 26, in the protrusion 350j, unlike the protrusion (350i of FIG. 25) shown in FIG. 25, the width of the second pattern 353j may be greater than the width of the first pattern 351j and the width of the third pattern 355j, and the width of the first pattern 351j may be substantially the same as the width of the third pattern 355j. The second pattern 353j may completely cover the first pattern 351j. The protrusion 350j may not include a second multilayer portion where two patterns selected from the first pattern 351j, the second pattern 353j, and the third pattern 355j overlap each other. The first multilayer portion ML1j of the protrusion 350j may include the first pattern 351j, the second pattern 353j, and the third pattern 355j, and the single-layer pattern SL1j of the protrusion 350j may include only the second pattern 351j.

Figure 27:
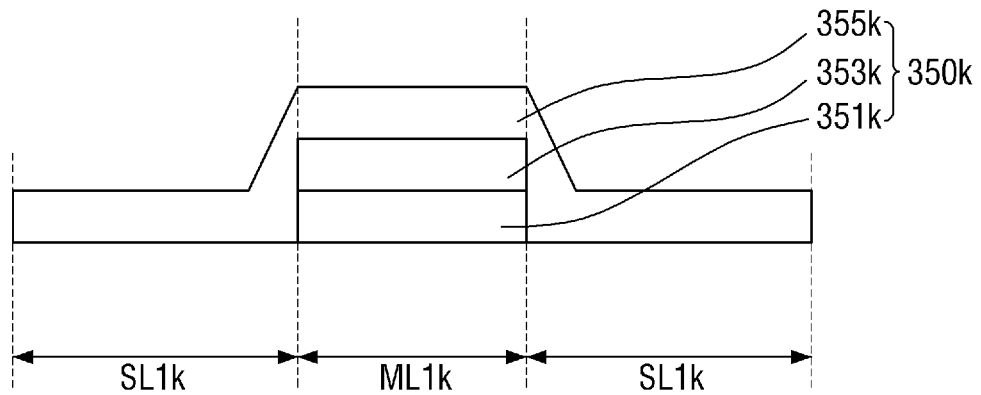

Referring to FIG. 27, in the protrusion 350k, unlike the protrusion (350i of FIG. 25) shown in FIG. 25, the width of the third pattern 355k may be greater than the width of the first pattern 351k and the width of the second pattern 353k, and the width of the first pattern 351k may be substantially the same as the width of the second pattern 353k. The third pattern 355k may completely cover the first pattern 351k and the second pattern 353k. The first multilayer portion ML1k of the protrusion 350k may include the first pattern 351k, the second pattern 353k, and the third pattern 355k, and the single-layer pattern SL1k of the protrusion 350k may include only the third pattern 355k. The protrusion 350k may not include a second multilayer portion where two patterns selected from the first pattern 351k, the second pattern 353k, and the third pattern 355k overlap each other.

Each of the protrusions described with reference to FIGS. 25 to 27 includes a second multilayer portion which is a portion where two patterns selected from a first pattern, a second pattern and a third pattern overlap each other. Each of the protrusions described with reference to FIGS. 25 to 27 may be applied to a structure of the display device shown in FIGS. 13 to 16, that is, a structure where the light-blocking member overlaps the single-layer portion of the protrusion and does not overlap the second multilayer portion of the protrusion.

Figure 28:
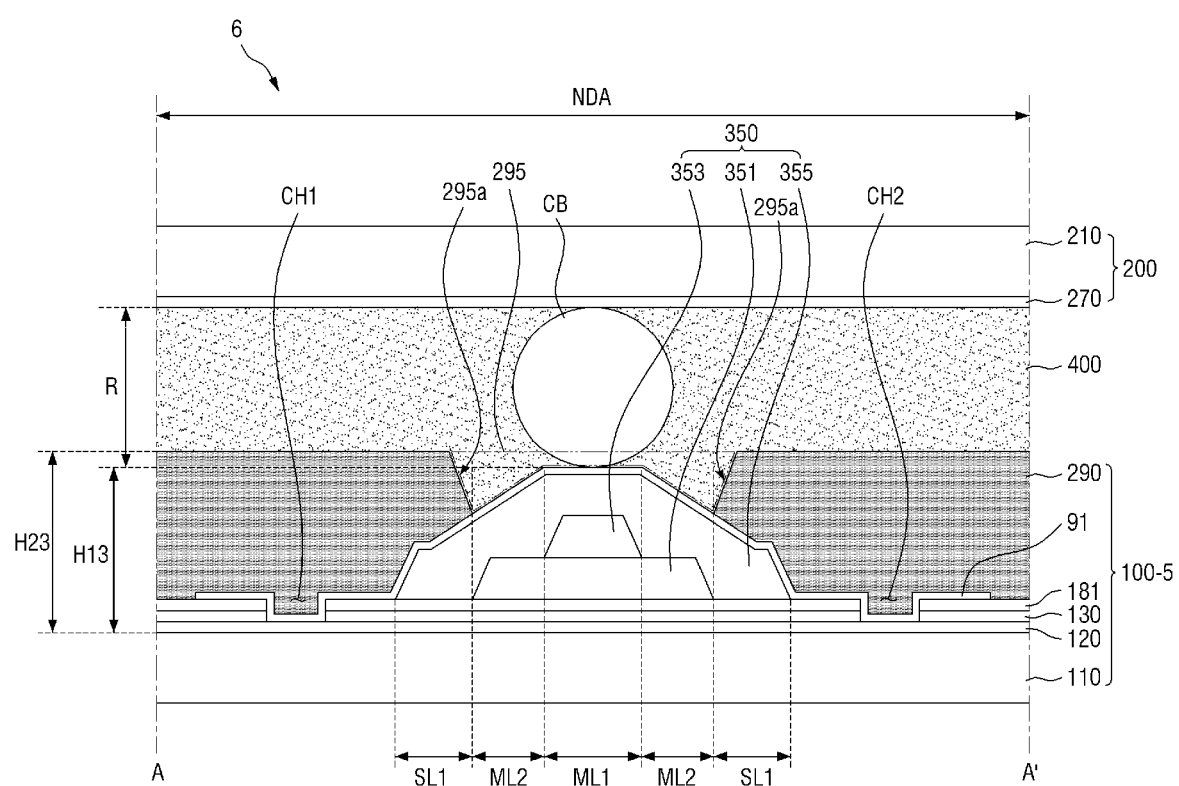
FIG. 28 is a sectional view of a display device according to an embodiment taken along a line analogous to the line A-A' of FIG. 2.

FIG. 28 is a sectional view of a display device 6 according to an embodiment taken along the line A-A' of FIG. 2.

Referring to FIG. 28, the display device 6 includes a first display panel 100-5, a second display panel 200 facing the first display panel 100-5, a sealing member 400 for attaching the first display panel 100-5 and the second display panel 200 together, and a liquid crystal layer (300 of FIGS. 1 to 6) disposed between the first display panel 100-5 and the second display panel 200.

The display device 6 is different from the display device (5 of FIGS. 13 to 16) described with reference to FIGS. 13 to 16 in that this display device 6 does not include the organic layer (183 of FIGS. 13 to 16. Other components of the display device 6 may be substantially same as those of the display device 5. Therefore, description may not be unnecessarily repeated, and differences are mainly described.

The first display panel 100-5 does not include an organic layer, unlike the first display panel (100-4 of FIGS. 13 to 16) described with reference to FIGS. 13 to 16. Thus, in the peripheral region NDA, the connecting electrode 91 is disposed on the passivation layer 181 to be in contact with the upper surface of the passivation layer 181. Further, the connection electrode 91 may be disposed directly over the protrusion 350 to be in direct contact with the protrusion 350.

If the maximum height from the one surface of the first base substrate 110 to the upper surface of the connection electrode 91 is referred to as a first height H13 and if the maximum height from one surface (or upper surface) of the first base substrate 110 to the upper surface of the light-blocking pattern 290 is referred to as a second height H23, in some embodiments, the difference Ha2 between the first height H13 and the second height H23 may be in a range of 0 μm to 2 μm.

The configuration of the first display panel 100-5 in the peripheral region NDA may be substantially the same as that of the first display panel (100-4 of FIGS. 13 to 16) described with reference to FIGS. 13 to 16.

According to embodiments, the protrusion 350 shown in FIG. 28 may be modified into one or more of the protrusions shown in FIGS. 17 to 27.

According to embodiments, a display device may have satisfactory reliability and satisfactory image display quality.

Although example embodiments have been disclosed for illustrative purposes, those skilled in the art will appreciate that various modifications, additions and substitutions are possible, without departing from the scope and spirit defined in the accompanying claims.

What is claimed is:

1. A display device, comprising:
a first base substrate including a display area and a peripheral area around the display area;
a voltage line disposed on the peripheral area of the first base substrate;
a protrusion disposed on the voltage line and including a first pattern including a first color material and a second pattern including a second color material different from the first color material;
a connection electrode disposed on the protrusion and connected with the voltage line; and
a light-blocking pattern disposed on the connection electrode and provided with an opening for partially exposing the connection electrode,
wherein the protrusion includes a multilayer portion where the first pattern and the second pattern overlap each other and a single-layer portion where the first pattern and the second pattern do not overlap each other, and
wherein the light-blocking pattern overlaps the single-layer portion, and the light-blocking pattern does not overlap the multilayer portion.

2. The display device of claim 1,
wherein the light-blocking pattern completely covers the single-layer portion.

3. The display device of claim 1,
wherein the multilayer portion overlaps the voltage line.

4. The display device of claim 1,
wherein the light-blocking pattern includes a portion overlapping the connection electrode and the single-layer portion, and
a difference between a maximum height from a surface of the first base substrate to an upper surface of the portion overlapping the connection electrode and the single-layer portion and a maximum height from the surface of the first base substrate to an upper surface of the connection electrode is 0 um or more and 2 um or less.

5. The display device of claim 1, further comprising:
an organic layer disposed between the connection electrode and the protrusion and including a hole exposing the voltage line,
wherein the protrusion does not overlap the hole, the connection electrode is connected to the voltage line through the hole, and the light-blocking pattern covers the hole.

6. The display device of claim 1, further comprising:
a gate line disposed on the display area of the first base substrate and a data line insulated from the gate line and intersecting the gate line;
a switching element disposed on the display area of the first base substrate and connected with the gate line and the data line;
a passivation layer disposed on the switching element;
a first electrode disposed on the passivation layer and connected with the switching element;
a color filter disposed between the first base substrate and the first electrode and overlapping the first electrode; and
a light-blocking member disposed on the passivation layer, overlapping the switching element, and made of the same material as the light-blocking pattern.

7. The display device of claim 6,
wherein the color filter includes the first color material or the second color material.

8. The display device of claim 6,
wherein the color filter includes a third color material different from the first color material and the second color material.

9. The display device of claim 6, further comprising:
an organic layer disposed between the switching element and the light-blocking member,
wherein the first electrode is connected to the switching element through a contact hole formed between the organic layer and the passivation layer, and the light-blocking member covers the contact hole.

10. The display device of claim 1, further comprising:
a second base substrate facing the first base substrate;
a second electrode disposed on a surface of the second base substrate facing the first base substrate; and
a conductive member electrically connecting a portion of the connection electrode, the portion being exposed through the opening, and the second electrode.

11. The display device of claim 10,
wherein the conductive member is a conductive ball.

12. The display device of claim 11, further comprising:
a sealing member disposed between the peripheral area of the first base substrate and the second electrode,
wherein the sealing member includes the conductive ball.

13. The display device of claim 1, wherein the first pattern directly contacts the second pattern in the multilayer portion.

14. A display device, comprising:
a first base substrate including a display area and a peripheral area around the display area;
a voltage line disposed on the peripheral area of the first base substrate;
a protrusion disposed on the voltage line and including a first pattern including a first color material, a second pattern including a second color material different from the first color material, and a third pattern including a third color material different from the first color material and the second color material;
a connection electrode disposed on the protrusion and connected with the voltage line; and
a light-blocking pattern disposed on the connection electrode, partially overlapping the protrusion, and provided with an opening for partially exposing the connection electrode,
wherein the protrusion includes a first multilayer portion where all the first pattern, the second pattern, and the third pattern overlap each other and a single-layer portion where the first pattern, the second pattern, and the third pattern do not overlap each other at all, and
wherein the light-blocking pattern does not overlap the first multilayer portion.

15. The display device of claim 14,
wherein the light-blocking pattern overlaps the single-layer portion.

16. The display device of claim 15,
wherein the single-layer portion completely overlap the light-blocking pattern.

17. The display device of claim 14, further comprising:
a second multilayer portion where only two patterns selected from the first pattern, the second pattern, and the third pattern overlap each other,
wherein the light-blocking pattern overlaps the second multilayer portion, and the single-layer portion completely overlaps the light-blocking pattern.

18. The display device of claim 14, further comprising:
a gate line disposed on the display area of the first base substrate and a data line insulated from the gate line and intersecting the gate line;
a switching element disposed on the display area of the first base substrate and connected with the gate line and the data line;
a first electrode connected with the switching element;
a color filter disposed between the first base substrate and the first electrode and overlapping the first electrode; and
a light-blocking member disposed on the switching element and made of the same material as the light-blocking pattern,
wherein the color filter includes any one of the first color material, the second color material, and the third color material.

19. The display device of claim 18, further comprising:
a second base substrate facing the first base substrate;
a second electrode disposed on one surface of the second base substrate facing the first base substrate; and
a conductive member electrically connecting a portion of the connection electrode, the portion being exposed through the opening, and the second electrode.

20. The display device of claim 14, wherein the second pattern directly contacts at least one of the first pattern and the third pattern in the first multilayer portion.

21. A display device, comprising:
a first base substrate including a display area and a peripheral area around the display area;
a voltage line disposed on the peripheral area of the first base substrate;
a protrusion disposed on the voltage line and including a color material;
an organic layer disposed on the voltage line and the protrusion and including a first upper surface spaced from the protrusion and not overlapping the protrusion, a second upper surface disposed relatively above the first upper surface and overlapping the protrusion, and a third upper surface bent relative to and directly connected with each of the first upper surface and the second upper surface;
a connection electrode disposed on the organic layer and connected with the voltage line; and
a light-blocking pattern disposed on the connection electrode, partially overlapping the protrusion, and provided with an opening for partially exposing a portion of the connection electrode, the portion overlapping the second upper surface,
wherein the second upper surface of the organic layer is positioned farther from the first base substrate than each of the first upper surface of the organic layer and the third upper surface of the organic layer, and
wherein the light-blocking pattern overlaps the third upper surface of the organic layer and does not overlap the second upper surface of the organic layer.

22. The display device of claim 21, further comprising:
a gate line disposed on the display area of the first base substrate and a data line insulated from the gate line and intersecting the gate line;
a switching element disposed on the display area of the first base substrate and connected with the gate line and the data line;
a first electrode connected with the switching element;
a color filter disposed between the first base substrate and the first electrode, overlapping the first electrode, and including the color material; and
a light-blocking member disposed on the switching element and made of the same material as the light-blocking pattern;
a second base substrate facing the first base substrate;
a second electrode disposed on one surface of the second base substrate facing the first base substrate; and
a conductive member electrically connecting a portion of the connection electrode, the portion being exposed through the opening, and the second electrode.

* * * * *